United States Patent [19]
Walch et al.

[11] Patent Number: 6,085,501
[45] Date of Patent: Jul. 11, 2000

[54] AUTOMATIC ADJUSTING FOR LIGHTENING A MACHINE WORKING UNIT: METHOD, DEVICE AND MACHINE

[75] Inventors: Martin Walch, Dettwiller; Joël Wilhelm, Saint-Louis; Bernard Wattron, Haegen; Rino Ermacora, Saint-Jean-les-Saverne; Alain Guesdon, Noisy sur Ecole, all of France

[73] Assignee: Kuhn S.A., Saverne, France

[21] Appl. No.: 09/147,102

[22] PCT Filed: Jan. 30, 1998

[86] PCT No.: PCT/FR98/00172

§ 371 Date: Oct. 5, 1998

§ 102(e) Date: Oct. 5, 1998

[87] PCT Pub. No.: WO98/33371

PCT Pub. Date: Aug. 6, 1998

[30] Foreign Application Priority Data

Feb. 3, 1997 [FR] France ................................ 97 01323

[51] Int. Cl.[7] .................................................. A01D 75/28
[52] U.S. Cl. .................................. 56/10.2 E; 56/DIG. 11; 172/7; 60/413; 91/390; 91/173; 92/63; 92/134
[58] Field of Search .............................. 60/421, 414, 413, 60/469; 56/10.2 E, DIG. 11; 172/7, 8; 91/4 R, 4 A, 390, 173; 92/13.1, 110, 174, 62, 63, 134

[56] References Cited

U.S. PATENT DOCUMENTS

| | | |
|---|---|---|
| 1,156,646 | 10/1915 | Walker ..................................... 188/320 |
| 2,679,827 | 6/1954 | Perdue ......................................... 92/8 |
| 3,869,861 | 3/1975 | Case . | |
| 4,070,035 | 1/1978 | Pelouch ................................. 280/6.158 |
| 4,474,247 | 10/1984 | Arnold . |
| 4,633,665 | 1/1987 | Buter et al. ............................... 92/134 |
| 4,646,620 | 3/1987 | Buchl ....................................... 92/13.1 |
| 4,646,849 | 3/1987 | Watuedt . |
| 5,376,135 | 12/1994 | Aulie ......................................... 623/43 |
| 5,802,638 | 9/1998 | Parker et al. ............................. 60/469 |
| 5,964,077 | 10/1999 | Guinn ................................... 56/10.2 E |

FOREIGN PATENT DOCUMENTS

| | | |
|---|---|---|
| 0 149 870 | 12/1984 | European Pat. Off. . |
| 0 570 314 | 5/1993 | European Pat. Off. . |
| 0 570 316 | 5/1993 | European Pat. Off. . |
| 0 579 564 | 7/1993 | European Pat. Off. . |
| 0 570 315 | 11/1993 | European Pat. Off. . |
| 0 741 960 | 11/1996 | European Pat. Off. . |
| 2 080 242 | 11/1971 | France . |
| 2 340 482 | 9/1977 | France . |
| 2 534 771 | 4/1984 | France . |
| 2 298 263 | 8/1984 | France . |
| 2 701 801 | 2/1993 | France . |
| 17 50 459 | 4/1971 | Germany . |
| 2001387 | 8/1971 | Germany ................................ 60/413 |
| 2436303 | 2/1976 | Germany ............................ 56/10.2 E |
| 2942927 | 2/1981 | Germany ................................... 172/7 |
| 2 053 645 | 11/1978 | United Kingdom . |
| WO 86/00002 | 1/1986 | WIPO . |

*Primary Examiner*—Thomas B. Will
*Assistant Examiner*—Nathan Mammen
*Attorney, Agent, or Firm*—Oblon, Spivak, McClelland, Maier & Neustadt, P.C.

[57] ABSTRACT

A method and device for automatically adjusting the lightening of a working unit (U) of a machine by use of a hydraulic ram (57) associated with a hydropneumatic accumulator (67). Use is made of a second hydraulic ram (58) of which the piston (53), which can move as far as a predetermined position (PP) in the cylinder (C2) and which is detached from the rod (46) of the first hydraulic ram (57), acts directly or indirectly on the latter rod via the oil (O) contained in the first hydraulic ram (57). The working unit (U) is raised and lowered by the second hydraulic ram (58). When raising the working unit (U), the volume of oil in the first hydraulic ram (57) is increased or decreased in such a way that the working unit (U) is always at a predetermined height (HP) at the end of raising travel.

55 Claims, 21 Drawing Sheets

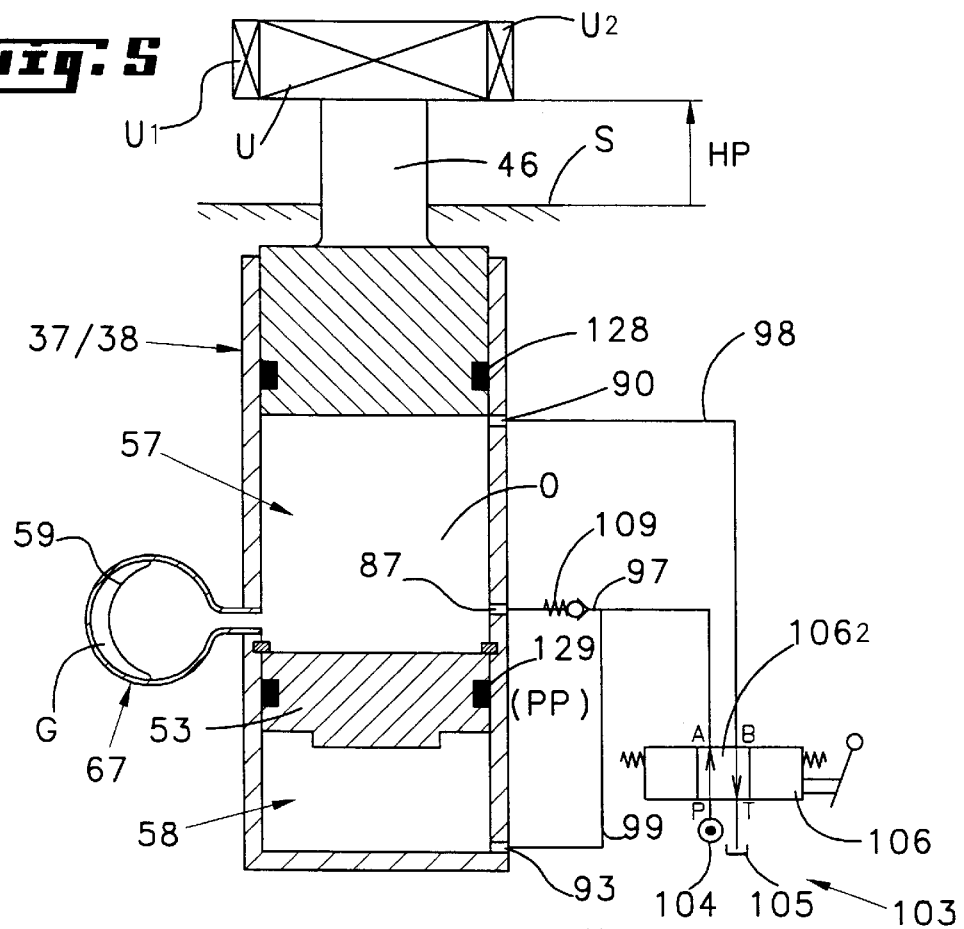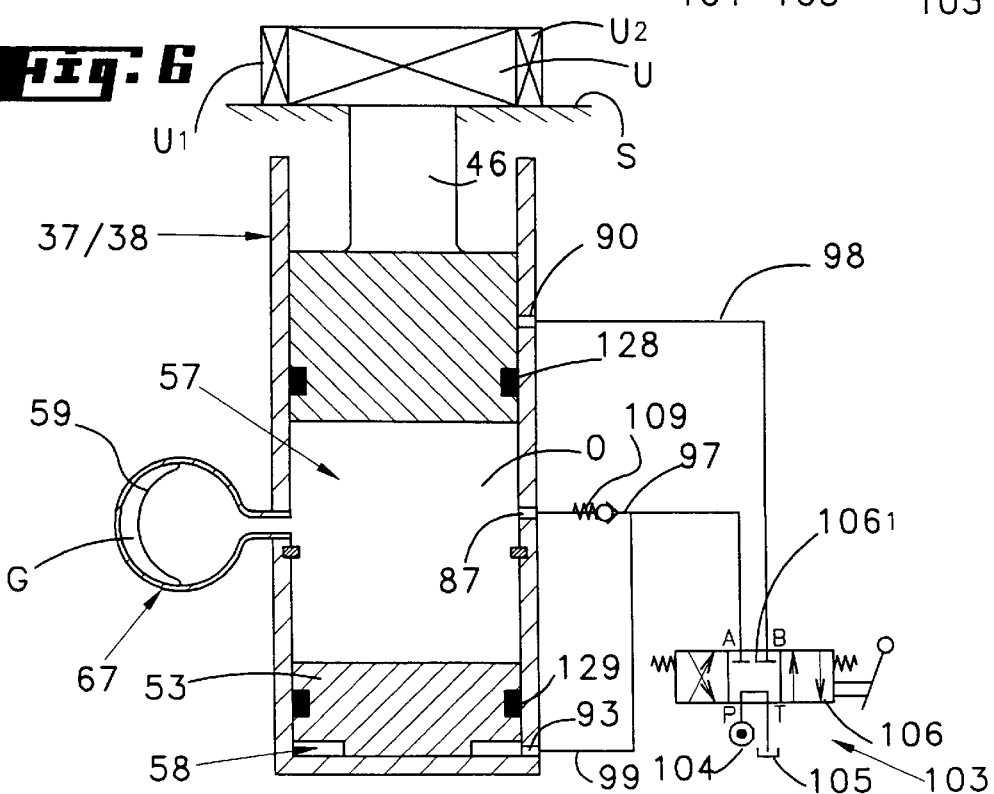

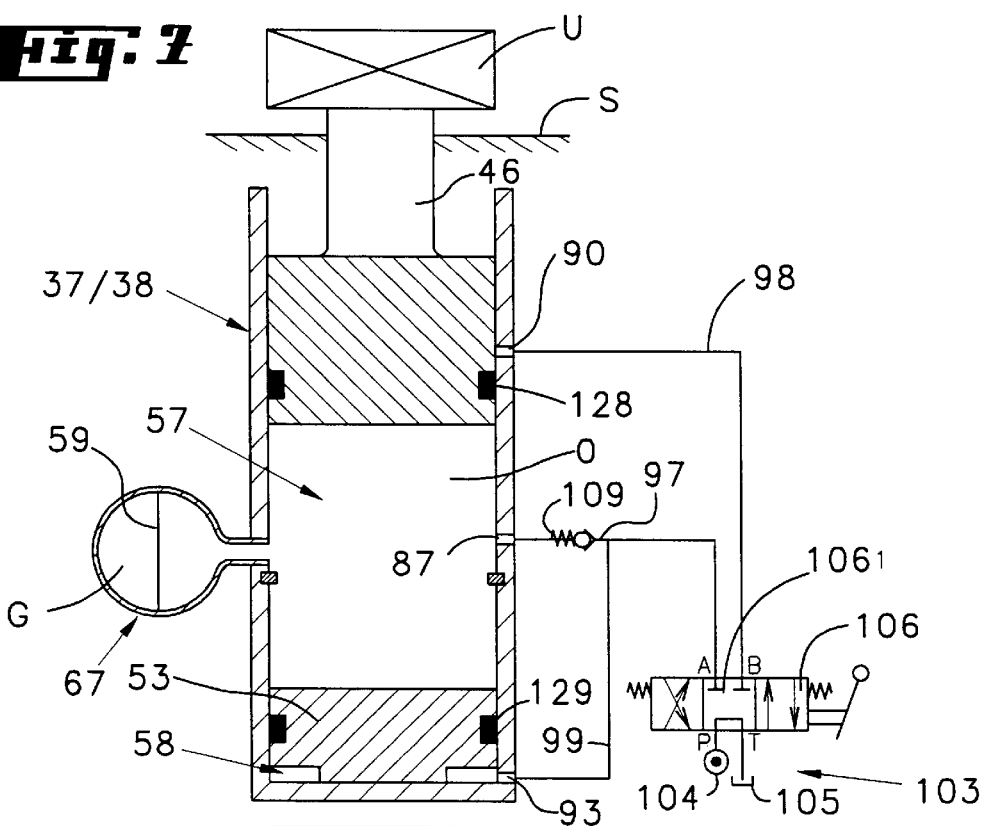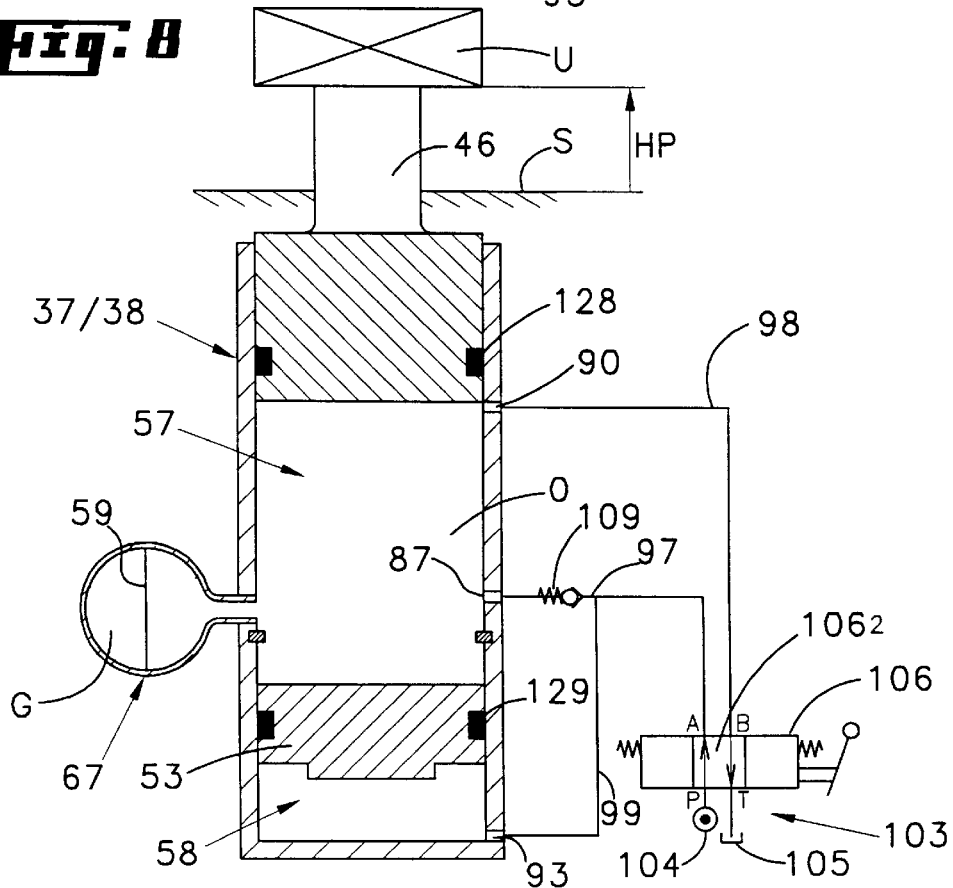

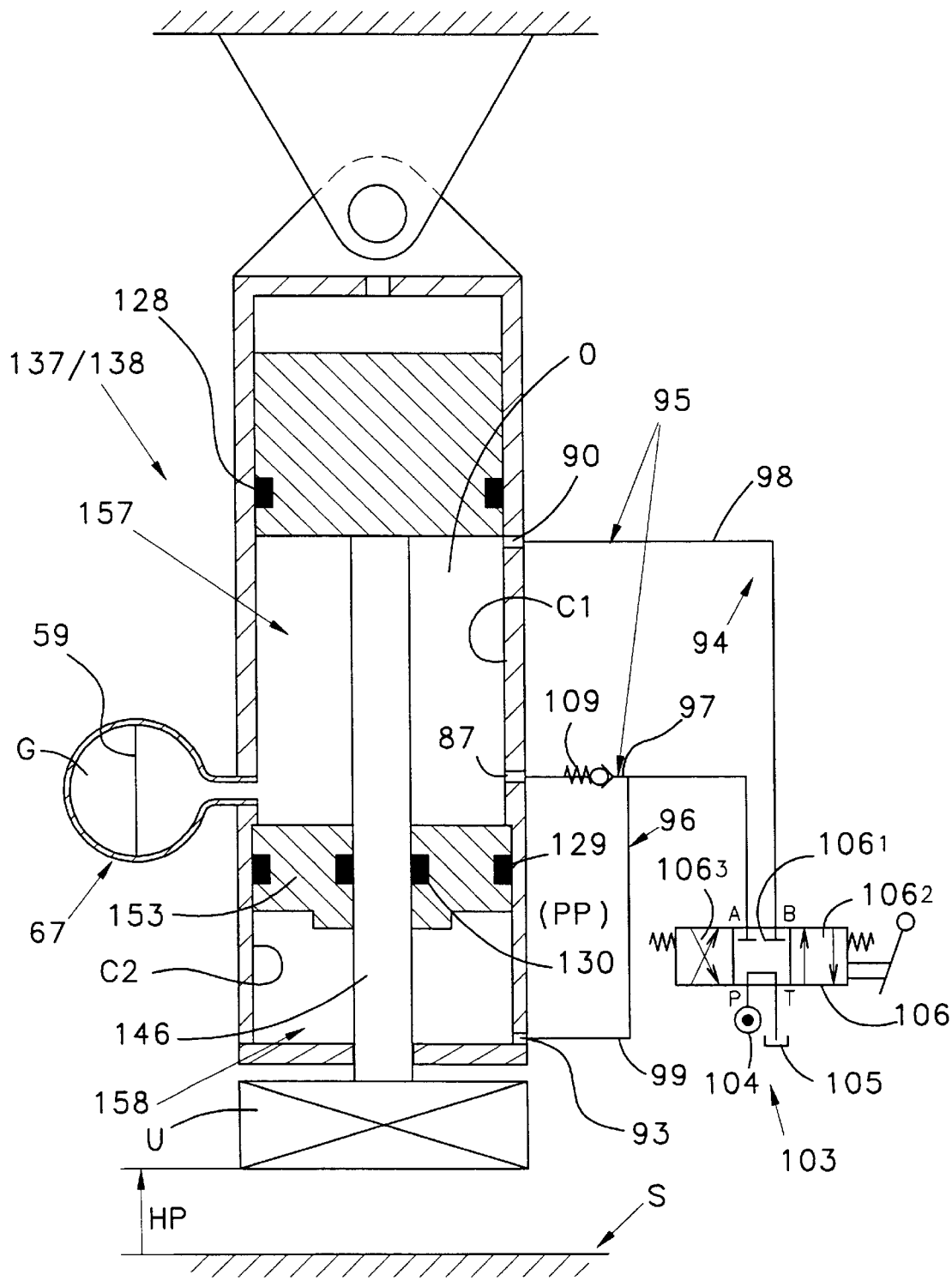

AUTOMATIC ADJUSTING FOR LIGHTENING A MACHINE WORKING UNIT: METHOD, DEVICE AND MACHINE

BACKGROUND OF THE INVENTION

1. Field of the Invention

The present invention relates to the adjustment of the lightening of a working unit of a machine, which working unit is carried by a carrying structure in such a way as to rest on the ground during work and be held away from the said ground when work is interrupted or during transport, it being possible for the said unit to be lowered so as to be brought to rest on the ground or to be raised so as to be brought away from the said ground by means of at least one hydraulic-energy converter fed by an oil-supply source through a hydraulic circuit.

By way of entirely non-limiting example, such machines may be encountered in the field of agriculture, civil engineering works, the upkeep of roads and verges, etc.

2. Discussion of the Background

The amount by which the working unit of such a machine is lightened is generally of great importance as regards the quality of the work done. Excessive lightening does not allow the working unit to remain continuously in contact with the ground. This will lead to uneven work. Insufficient lightening, on the other hand, in some cases increases the risk of clogging, increases the power that needs to be developed to move the working unit, and increases wear.

In the field of mowers, for example, it is known practice for the harvesting mechanism (working unit) to be lightened by means of a lightening device comprising at least one elastically deformable member, the action of which can be adjusted by means of an adjusting device coupled to the said elastically deformable member.

As elastically deformable members, it is known practice to use mechanical tension springs (GB 2 053 645 A), mechanical compression springs, torsion bars, deformable cushions filled with air (EP 0 570 315 A1) or nitrogen-filled accumulators combined with hydraulic rams (EP 0 149 870 A1).

The lightening provided by these elastically deformable members is generally adjusted manually and requires a number of tests, with work being interrupted, and this may lead to time being lost especially since, as the initial adjustment is carried out when the working unit is clean, there is the risk that it will soon become inappropriate during work as a result of a build-up of earth, for example.

Various solutions have already been proposed to facilitate this adjustment.

Described in document HP 0 149 870 A1 is a solution which consists in constantly measuring the pressure with which the working unit of a machine rests on the ground. The working unit is provided with a runner which is connected to it so that it can pivot. A piston and cylinder sensor is fitted between the said runner and the chassis of the working unit. A conversion device converts the pressure in the piston and cylinder sensor into an electrical signal which controls an electric motor. This electric motor drives a pinion which meshes with a rack actuating the rod of a compensation ram equipped with gas accumulators. This compensation ram is in communication with hydraulic rams fitted between the chassis of the working unit and the arms of the wheels via which the working unit runs along the ground.

When the pressure in the piston and cylinder sensor increases following an increase in weight of the working unit, the electrical signal created actuates the electric motor in a direction such that the pressure in the compensating ram and the hydraulic rams increases. This correction takes place entirely automatically until the correct pressure is achieved.

Described in document WO 86/00002 is a solution which consists also in measuring the pressure with which the cutting head (working unit) of a harvesting machine rests on the ground. The cutting head of this harvesting machine is carried by a chassis coupled to a tractor and comprising two wheels by means of which it runs along the ground. Each wheel is connected in a pivoting fashion to a corresponding side wall of the chassis by means of a wheel arm. A hydraulic ram associated with a hydropneumatic accumulator is fitted between each wheel arm and the corresponding side wall.

The cutting head comprises a certain number of runners which are connected in pivoting fashion to the bar of the said cutting head. A strain gauge is fixed on the top of a runner and supplies an electrical signal which is a function of the change in pressure exerted by the said runner on the ground. This electrical signal is transmitted to an amplifier with two outputs, each of which is connected to an electrovalve. These electrovalves allow the hydraulic rams to be connected to an oil-supply source. Depending on the signal emitted by the strain gauge, the amplifier controls the appropriate electrovalve with a view to feeding the hydraulic rams with oil, or to respectively withdrawing oil from the said hydraulic rams in order to raise, or respectively to lower, the cutting head until the desired pressure with which the cutting head should rest on the ground is re-established.

These two solutions do, however, have a certain number of drawbacks.

A first drawback lies in the fact that the sensors (piston and cylinder in EP 0 149 870 A1 and strain gauge in WO 86/00002) have to be placed under the working unit which, in some types of machine, may prove prejudicial to the quality of work done.

A second drawback lies in the fact that these sensors and the connections which transmit the information they supply, have to be situated in places where, bearing in mind the environment in which these machines work, there is a risk that they will soon become damaged.

A third drawback lies in the fact that the number of parameters is such that correct lightening is rarely achieved. By way of non-limiting example, mention may be made of the nature of the ground, for example: in firm ground, the runners will effectively slide over the surface of the ground, whereas in soft ground, they will dig into the ground a little bit and this will change the information supplied by the sensors. Now, the user is not generally in a position to supply the new values of the parameters to the device which manages the information received from the sensors.

Finally, a fourth drawback lies in the fact that the device constantly corrects during work, and this may also have a harmful influence on the quality of work done.

Described in document EP 0 741 960 A1 is a solution in which the user can adjust the lightening of the harvesting mechanism (working unit) of a mower from the driving position of the motor vehicle to which the mower is connected.

In a first embodiment (FIGS. 6 and 9) the lightening device comprises two elastically deformable members, the action of each of which can be adjusted by means of an adjusting device coupled to the said elastically deformable members each of which consists of a deformable envelope containing gas at an adjustable pressure (air cushion in FIG. 6, and hydropneumatic ram in FIG. 9).

This adjustment device in particular comprises a feed circuit equipped with one valve per deformable envelope intended, with a view to adjusting the value of the pressure of the gas contained in the said deformable envelope, to let into the deformable envelope a fluid delivered by a feed source (air delivered by a compressor in FIG. 6 and oil delivered by the hydraulic system of the motor vehicle in FIG. 9), to maintain the pressure of the gas contained in the deformable envelope, or to let fluid out of the said deformable envelope. For this, each valve is an electrovalve that can be controlled electrically by the user from the driving position of the motor vehicle and having two positions: a first position in which fluid can neither get into nor out of the deformable envelope and a second position in which fluid can get into or out of the deformable envelope.

In a second embodiment (FIG. 12), the lightening device comprises two mechanical springs, the action of which can be adjusted by means of an adjusting device which comprises a ram for each mechanical spring and a circuit for feeding these two rams. This feed circuit is equipped with a valve associated with each ram and intended, with a view to adjusting the action of the corresponding mechanical spring, to let fluid delivered by a feed source into the ram, to maintain the fluid in the said ram or to let fluid out of the said ram. For this, each valve can be controlled by the user from the driving position of the motor vehicle and has two positions: a first position in which the fluid can neither get into nor out of the ram, and a second position in which fluid can get into or out of the ram.

In these known mowers, the user can, from the driving position of the motor vehicle, either increase or decrease the action of the two elastically deformable members, as the case may be, until they work in the optimum way. Moreover, a skilled driver can carry out this operation without interrupting the mowing.

If, during work, the user notices that the behaviour of the mower has changed, all he will need to do, without leaving his driving position, or even, as already stated, without interrupting the mowing, will be to readjust the value of the action afforded by the elastically deformable members.

It is true that in these known mowers the value of the lightening is simple and quick to adjust, but it does require the intervention of the user.

Described in document FR 2 701 801 A1 is a device for automatically adjusting the lightening of a working unit of a machine. This working unit is carried by a carrying structure so that it rests on the ground during work and is held away from the said ground when work has to be interrupted or during transport. This working unit may be lowered to be brought to rest on the ground or raised to be moved away from the said ground by means of the said device which comprises hydraulic-energy converters fed by a hydraulic circuit comprising in particular a hydropneumatic accumulator. The pressure of the gas contained in this hydropneumatic accumulator can be set initially to a value that corresponds to the desired amount of lightening of the working unit.

This hydraulic circuit comprises a main circuit which allows the working unit to be raised or lowered, and a secondary circuit which affords predetermined lightening of the working unit once it is resting on the ground.

Furthermore, this secondary circuit makes it possible to maintain this predetermined lightening irrespective of the variations in level of the ground on which the working unit is resting.

By contrast, if, following the build-up of earth on the working unit, the weight of the latter has increased, the user has manually to modify the amount of lightening if he wishes to return to the same apparent weight of the working unit.

SUMMARY OF THE INVENTION

The object of the present invention is to provide a solution in which the predetermined amount of lightening of the working unit of a machine is maintained irrespective of the change in weight of the said working unit during use.

To this end, a method for automatically adjusting the lightening of a working unit of a machine, which working unit is carried by a carrying structure in such a way as to rest on the ground during work and be held away from the said ground when work is interrupted or during transport, it being possible for the said working unit to be lowered so as to be brought to rest on the ground or to be raised so as to be brought away from the said ground by means of at least one hydraulic-energy converter fed by an oil-supply source through a hydraulic circuit and having a first hydraulic ram equipped with a rod and associated with a hydropneumatic accumulator in which the pressure of the gas can be set initially to a value that corresponds to the amount of lightening desired for the working unit, is proposed which is characterized in that:

use is made of one (or more) hydraulic-energy converter(s) (each) having the(a) first hydraulic ram associated with the(a) hydropneumatic accumulator, and a second hydraulic ram of which the piston, which can move as far as a predetermined position in the cylinder of the said second hydraulic ram and which is detached from the rod of the corresponding first hydraulic ram, acts directly or indirectly on the latter rod via the oil contained in the corresponding first hydraulic ram;

the working unit is raised and lowered using the second hydraulic ram(s);

when raising the working unit:
the volume of oil in the first hydraulic ram(s) is increased if, and only if, with the piston(s) of the second hydraulic ram(s) in its(their) predetermined position, the working unit does not reach a predetermined height;
the volume of oil in the first hydraulic ram(s) is decreased if, and only if, the working unit has reached the predetermined height, while the piston(s) of the second hydraulic ram(s) has(have) not yet reached its(their) predetermined position;

in such a way that the working unit is always at the predetermined height at the end of raising travel, that is to say when the piston(s) of the second hydraulic ram(s) is(are) in its(their) predetermined position;

when lowering the working unit the volume of oil in the first hydraulic ram(s) is maintained.

The invention also relates to a device for automatically adjusting the lightening of a working unit of a machine for implementing the above method, which working unit is carried by a carrying structure in such a way as to rest on the ground during work and be held away from the said ground when work is interrupted or during transport, it being possible for the said working unit to be lowered so as to be brought to rest on the ground or to be raised so as to be brought away from the said ground by means of the said device comprising at least one hydraulic-energy converter fed by an oil-supply source through a hydraulic circuit and having a first hydraulic ram equipped with a rod and associated with a hydropneumatic accumulator in which the pressure of the gas can be set initially to a value that corresponds to the amount of lightening desired for the working unit, the said hydraulic circuit comprising a first hydraulic system coupled to the first hydraulic ram of the said(of each) hydraulic-energy converter which has one(or more) suitable orifice(s) for connection to this first hydraulic system, the said device being characterized in that:

the(each) hydraulic-energy converter has a second hydraulic ram of which the piston, which can move as far as a predetermined position in the cylinder of the said second hydraulic ram and which is detached from the rod of the corresponding first hydraulic ram, acts directly or indirectly on the latter rod via the oil contained in the corresponding first hydraulic ram;

the hydraulic circuit comprises a second hydraulic system coupled to the second hydraulic ram of the(of each) hydraulic-energy converter, the said(each) hydraulic-energy converter also having one(or more) suitable orifice(s) for connecting this second hydraulic system;

means which make it possible, as appropriate, to increase or to decrease the volume of oil in the(in each) first hydraulic ram at the end of raising travel of the working unit;

means which make it possible to maintain the volume of oil in the(each) first hydraulic ram when the working unit is being lowered.

Finally, the invention also relates to a machine comprising a device for automatically adjusting the lightening of its working unit as described hereinabove.

The solution proposed therefore calls upon neither sensors placed under the working unit or on manual intervention from the user of the machine in order to maintain the predetermined amount of lightening irrespective of changes in the weight of the said working unit during use. Nor therefore does it have the drawbacks that are the result of such features.

The invention also relates to the features below, taken in isolation or in any technically possible combination thereof.

In an advantageous embodiment of the device for automatically adjusting the lightening of a working unit of a machine, provision may be made for the(each) hydropneumatic accumulator to be integrated into the corresponding hydraulic-energy converter. Incidentally, as a preference, this hydropneumatic accumulator will in particular surround the cylinder of the first hydraulic ram of the said hydraulic-energy converter. For this, the said hydraulic-energy converter may comprise an inner cylinder in particular forming the cylinder of the first hydraulic ram, an outer cylinder and a deformable membrane dividing the space between these two cylinders into two volumes: a first volume containing the gas and a second volume containing the oil, the pressure of which will be identical to the pressure of the oil contained in the first hydraulic ram. This first volume containing the gas and this second volume containing the oil will constitute the said hydropneumatic accumulator. The first volume may advantageously be the one delimited in particular by the outer cylinder and the membrane and the second volume the one in particular delimited by the inner cylinder and the membrane. In this case, the outer cylinder or a closing-off ring connected to the said outer cylinder may also have an inflation valve allowing gas to be blown into the first volume. The inner cylinder, finally, may also constitute the cylinder of the second hydraulic ram.

In another solution, it is the rod of the(of each) first hydraulic ram which may be hollow and constitute the cylinder of the corresponding second hydraulic ram. In this case, the feed orifice of the(of each) second hydraulic ram will advantageously be made close to the outer end of the rod.

When the hydraulic-energy converter raises the working unit by lengthening (first family of embodiments), the piston of the(of each) second hydraulic ram may be made in the form of a plunger piston or of an annular piston.

By contrast, when the hydraulic-energy converter raises the working unit by shortening (second family of embodiments), the piston of the(of each) second hydraulic ram will advantageously be made in the form of an annular piston through which the rod of the corresponding hydraulic-energy converter passes.

The predetermined position as far as which the piston can move in the cylinder of the(of each) second hydraulic ram may advantageously be determined by a stop. This stop may consist of a tie rod secured to that end of the corresponding hydraulic-energy converter which is on the same side as the second hydraulic ram. This tie rod may extend partially inside the piston of the second hydraulic ram or pass through the said piston. In both cases, it will be advantageous for the tie rod to extend coaxially to the said piston.

The said stop may also consist of a shoulder, fixed or attached, provided in the cylinder of the second hydraulic ram.

In another solution, the said predetermined position as far as which the piston can move in the cylinder of the(of each) second hydraulic ram may be determined by at least one limiting orifice provided in the cylinder of the second hydraulic ram and intended to discharge the surplus oil injected into the said second hydraulic ram. This(these) limiting orifice(s) may moreover advantageously open directly or indirectly into the corresponding first hydraulic ram.

Provision may also be provided for a damper to damp the movements of the rod of the(of each) hydraulic-energy converter which are allowed by the corresponding hydropneumatic accumulator. As a preference, the said damper will have means which will slow down the rise of the working unit more than its fall. These means may be designed to slow down the flow of oil into the(each) first hydraulic ram more when the working unit rises than when it falls. In an advantageous embodiment, the said damper could extend into the corresponding first hydraulic ram and have a discoid part in which there are made a central hole and at least one hole arranged beside the central hole, a hollow screw screwed into the central hole and a concave washer extending between the hollow screw and the corresponding face of the discoid part, the concaveness pointing towards the said face so that it partially covers the hole(s) arranged beside the central hole. Provision may additionally be made for one(or more) elastic washer(s) to be inserted between the concave washer and the corresponding face of the discoid part.

Moreover, this damper may be fitted in a hollow part exhibited by the rod of the corresponding hydraulic-energy converter.

As stated earlier, the (each) hydraulic-energy converter has suitable orifices connected to the corresponding first hydraulic system and to the corresponding second hydraulic system. One of these orifices connected to the corresponding first hydraulic system will advantageously be a leak-off orifice which will allow oil contained in the first hydraulic ram to return to the oil-supply source through the said first hydraulic system. The feed orifice of the said first hydraulic ram and this leak-off orifice will thus form part of the means that allow the volume of oil in the said first hydraulic ram to be increased or decreased.

The (each) hydraulic-energy converter may advantageously comprise a ring capable of sliding in sealed fashion in the body of the said hydraulic-energy converter and having at least one orifice which will allow the first hydraulic ram to communicate with the leak-off orifice. This (these) orifice(s) of the said ring will be placed in communication with the leak-off orifice as the working unit is raised. This (these) orifice(s) of the said ring may moreover advantageously be placed in communication with the leak-off orifice by the rod of the hydraulic-energy converter itself. The said orifice(s) of the ring may be taken out of communication with the leak-off orifice by an elastically deformable member.

In an advantageous embodiment, the rod of the (of each) hydraulic-energy converter may have a hollow part into which at least one hole opens, allowing the first hydraulic ram to be placed directly or indirectly in communication with the leak-off orifice. The (each) hydraulic-energy converter may additionally have a collector connected to the leak-off orifice and at least partially surrounding the rod of the said hydraulic-energy converter.

The (each) first hydraulic system may advantageously have a first hydraulic passage intended to feed the corresponding first hydraulic ram and a second hydraulic passage in communication with the leak-off orifice of the said first hydraulic ram. The (each) second hydraulic system, for its part, will have a third hydraulic passage in communication with the feed orifice of the corresponding second hydraulic ram. Moreover, the means allowing the volume of oil in the (each) first hydraulic ram to be maintained as the working unit is lowered, may advantageously have a means which quite simply prevents oil from getting out of the said first hydraulic ram through the first hydraulic passage. Finally, a means will also be provided which will favour the feeding of the second hydraulic ram as the working unit is being raised.

In a first non-limiting embodiment, the first hydraulic passage will be coupled directly or indirectly to the third hydraulic passage, while the means preventing oil from getting out of the first hydraulic ram through the first hydraulic passage will be fitted between the feed orifice of the corresponding first hydraulic ram and the coupling of the said first hydraulic passage to the said third hydraulic passage.

In a second non-limiting embodiment, the first hydraulic passage will consist at least partially of the third hydraulic passage and of a communication between the second hydraulic ram and the first hydraulic ram. In this case, the means preventing oil from getting out of the first hydraulic ram through the first hydraulic passage may advantageously act in particular at the said communication between the second hydraulic ram and the first hydraulic ram. When the stop defining the predetermined position as far as which the piston can move in the cylinder of the (of each) second hydraulic ram consists of a tie rod which passes through the piston of the said second hydraulic ram, the said communication between the second hydraulic ram and the first hydraulic ram may advantageously be provided in the said tie rod.

However, this communication could also advantageously be provided at least partially in the piston of the second hydraulic ram. When the predetermined position as far as which the piston can move in the cylinder of the (of each) second hydraulic ram is determined by at least one limiting orifice provided in the cylinder of the second hydraulic ram, the said communication may additionally consist of the said limiting orifice(s).

The means preventing oil from getting out of the first hydraulic ram through the first hydraulic passage may quite simply consist of a first non-return valve.

As far as the means which favours the feeding of the second hydraulic ram as the working unit is raised is concerned, this means will preferably be produced in the form of a means which will prevent the first hydraulic ram from being fed as long as the piston of the second hydraulic ram is not in its predetermined position. This means may quite simply consist of the first non-return valve which for this purpose will be produced in the form of a preloaded non-return valve.

Provision may also advantageously be made for the feeding of the first hydraulic ram to be done through a throttle-valve, preferably an adjustable one. This will allow the first hydraulic ram to be fed gradually with a view to the precise adjustment of the lightening during raising of the working unit.

When the device for automatically adjusting the lightening of the working unit comprises a number of hydraulic-energy converters it will be preferable for all the first hydraulic rams of these to be fed through a single restrictor.

The second hydraulic passage, for its part, may also comprise a second non-return valve preventing oil from flowing in the oil-supply source/first hydraulic ram direction.

The third hydraulic passage, for its part, may advantageously comprise a first controlled non-return valve preventing oil from flowing in the second hydraulic ram/oil-supply source direction, and the opening of which will be controlled by the pressure prevailing in the second hydraulic passage.

This first controlled non-return valve will constitute a safety element which will prevent oil from getting out of the second hydraulic ram when the working unit is moved away from the ground (transport position for example). The oil contained in the second hydraulic ram will actually be able to leave this ram only when the oil contained in the second hydraulic passage is under pressure.

Likewise, the second hydraulic passage may also comprise a second controlled non-return valve preventing oil from flowing in the first hydraulic ram/oil-supply source direction. The opening of the first controlled non-return valve and respectively of this second controlled non-return valve will be controlled by the pressure prevailing in the second hydraulic passage upstream of the second controlled non-return valve and respectively by the pressure prevailing in the third hydraulic passage upstream of the first controlled non-return valve. This second controlled non-return valve will also constitute a safety element which will prevent oil from getting out of the first hydraulic ram through the leak-off orifice when this is not desired. The oil contained in the first hydraulic ram will be able to leave this ram only when the oil contained in the third hydraulic passage is under pressure. This second controlled non-return valve will advantageously be provided upstream of the second non-return valve that the second hydraulic passage may also have.

It should be specified that the words "upstream" and "downstream" in the description above and below have those meanings when considering the hydraulic circuit in the oil-supply source/hydraulic-energy converter(s) direction.

The invention finds an application quite especially in the field of agricultural machines and especially cutting machines, particularly those intended for harvesting, such as mowers with or without a device for treating the cut product.

BRIEF DESCRIPTION OF THE DRAWINGS

Other features of the invention will emerge from the following description given with reference to the appended drawing in which:

FIGS. 1 to 10 diagrammatically illustrate the method for automatically adjusting the lightening of a working unit of a machine according to the invention on the basis of the first family of embodiments of devices employing the said method, in which the hydraulic-energy converter(s) raise(s) the working unit by lengthening;

FIG. 28 depicts the hydraulic-energy converter of FIG. 27 when the working unit is moved away from the ground.

DETAILED DESCRIPTION OF THE PREFERRED EMBODIMENTS

Figure 1:
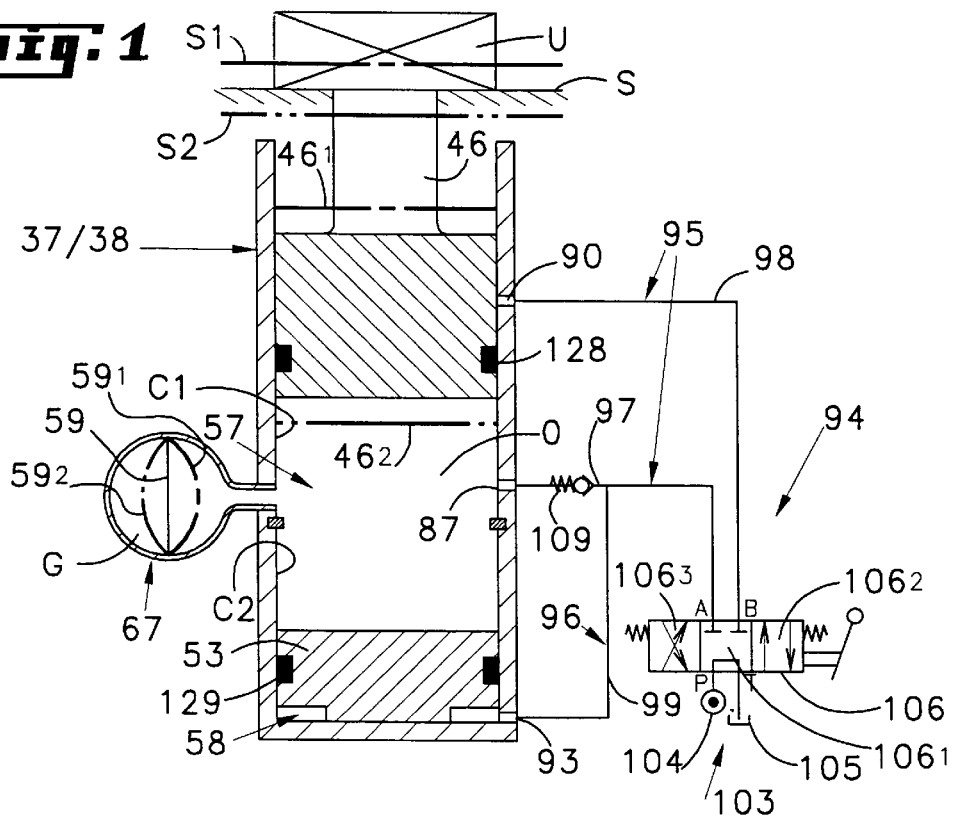

The invention relates to a method for automatically adjusting the lightening of a working unit U of a machine. This working unit U is generally carried by a carrying structure so that it rests on the ground S during work and is held away from the said ground S when work is interrupted or during transport. The said working unit U can be lowered to be made to rest on the ground S or raised to be moved away from the said ground S by means of at least one hydraulic-energy converter 37/38 fed by an oil-supply source 103 through a hydraulic circuit 94.

This hydraulic-energy converter 37/38 comprises a first hydraulic ram 57 especially equipped with a rod 46 and associated with a hydropneumatic accumulator 67 in which the pressure of the gas G can be set initially to a value that corresponds to the desired amount of lightening for the working unit U.

This hydraulic-energy converter 37/38 additionally comprises a second hydraulic ram 58 of which the piston 53 can move in the cylinder $C_2$ of the said second hydraulic ram 58 as far as a predetermined position PP provided in the said cylinder $C_2$. The piston 53 of the second hydraulic ram 58 is detached from the rod 46 of the first hydraulic ram 57 and acts on the latter rod 46 via the oil O contained in the first hydraulic ram 57.

Oil is fed to the first hydraulic ram 57 through a feed orifice 87. The hydraulic-energy converter 37/38 additionally comprises a leak-off orifice 90 via which oil contained in the first hydraulic ram 57 can leave.

The feed to the second hydraulic ram 58, for its part, is done through a feed orifice 93.

The hydraulic circuit 94 comprises a first hydraulic system 95 coupled to the first hydraulic ram 57, and a second hydraulic system 96 coupled to the second hydraulic ram 58. The first hydraulic system 95 comprises a first hydraulic passage 97 in connection with the feed orifice 87 of the first hydraulic ram 57, and a second hydraulic passage 98 connected to the leak-off orifice 90 of the said first hydraulic ram 57. The second hydraulic system 96, for its part, comprises a third hydraulic passage 99 connected to the feed orifice 93 of the second hydraulic ram 58 and coupled to the first hydraulic passage 97. The latter further has a means 109 which on the one hand prevents the first hydraulic ram 57 from being fed as long as the piston 53 of the second hydraulic ram 58 is not in its predetermined position PP and on the other hand prevents oil O from getting out of the said first hydraulic ram 57 through the feed orifice 87.

The oil-supply source 103 comprises a pump 104, a tank 105 and a distributor 106. The distributor 106 has four orifices: a first orifice P to which the pump 104 is connected, a second orifice T to which the tank 105 is connected, a third orifice A connected to the third hydraulic passage 99 and thus to the first hydraulic passage 97, and a fourth orifice B in connection with the second hydraulic passage 98. The distributor 106 also has three positions: a neutral position $106^1$ in which the pump 104 and the tank 105 are isolated from the hydraulic circuit 94, a first active position $106^2$ in which the pump 104 and the tank 105 respectively are in connection with the third orifice A and the fourth orifice B respectively, and a second active position $106^3$ in which the pump 104 and the tank 105 respectively are in connection with the fourth orifice B and the third orifice A respectively.

FIG. 1 depicts the work position. The working unit U is resting on the ground S. The pressure of the gas G in the hydropneumatic accumulator 67 is set at a given value that corresponds to the desired apparent weight for the working unit U. In this position, the working unit U can follow the relief of the ground S which varies between $S^1$ and $S^2$, because the hydropneumatic accumulator 67 allows the rod 46 to move in the cylinder $C_1$ of the first hydraulic ram 57 between the positions $46^1$ and $46^2$ by deformation of the membrane 59 between the positions $59^1$ and $59^2$.

Figure 2:
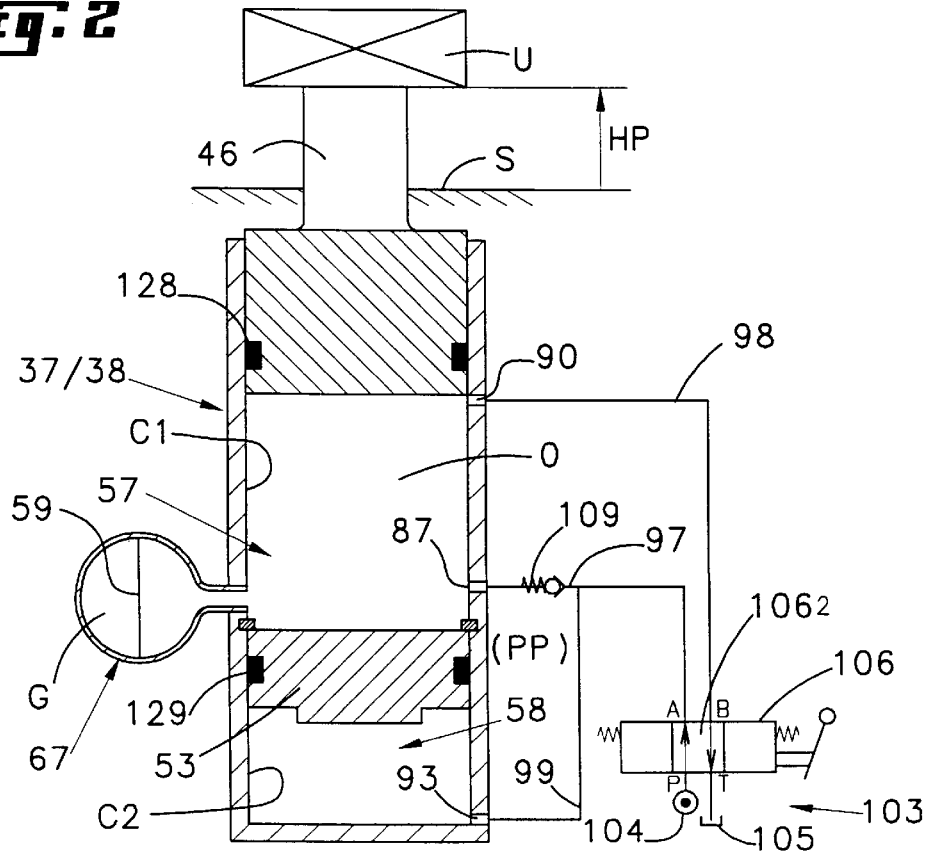

FIG. 2 illustrates the position in which the working unit U is held away from the ground S. The change from the situation of FIG. 1 to the situation of FIG. 2 takes place by placing the distributor 106 in the first active position $106^2$. Given that the means 109 prevents the first hydraulic ram 57 from being fed as long as the piston 53 of the second hydraulic ram 58 is not in its predetermined position PP in the cylinder $C_2$ of the said second hydraulic ram 58, the oil supplied by the pump 104 enters the second hydraulic ram 58 and moves the said piston 53 towards its predetermined position PP. While this is happening, the piston 53 pushes the rod 46 of the first hydraulic ram 57 out of the hydraulic-energy converter 37/38 by means of the oil O contained in the first hydraulic ram 57. The leak-off orifice 90 is provided in the cylinder $C_1$ of the first hydraulic ram 57 at a point such that when the piston 53 of the second hydraulic ram 58 reaches its predetermined position PP, the rod 46 of the first hydraulic ram 57 more or less uncovers the leak-off orifice 90. The working unit U will then be at a predetermined height HP.

By continuing to feed the hydraulic circuit 94, the oil supplied by the pump 104 could of course enter the first hydraulic ram 57 through the feed orifice 87—the means 109 actually allows the first hydraulic ram 57 to be fed when the piston 53 of the second hydraulic ram 58 is in its predetermined position PP—but this oil would come straight back out again through the leak-off orifice 90.

By returning the distributor 106 to its neutral position $106^1$, the working unit U will be kept away from the ground S.

Figure 3:
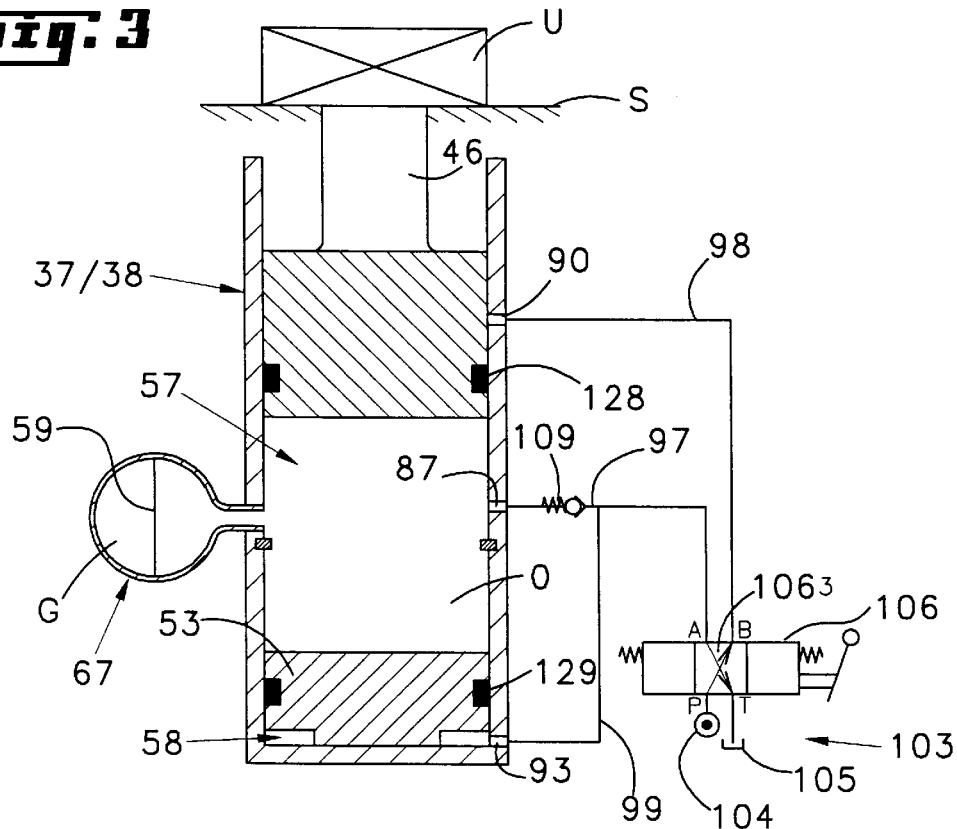

To return from the position in which the working unit U is held away from the ground S to the position illustrated in FIG. 1, the distributor 106 is placed in its second active position $106^3$: this is what is illustrated in FIG. 3. The weight of the working unit U then expels the oil contained in the second hydraulic ram 58 towards the tank 105 of the oil-supply source 103. The volume of oil O contained in the first hydraulic ram 57 however remains the same because no oil can get out through the leak-off orifice 90 and through the feed orifice 87. The amount of lightening of the working unit U therefore remains unchanged.

Figure 4:
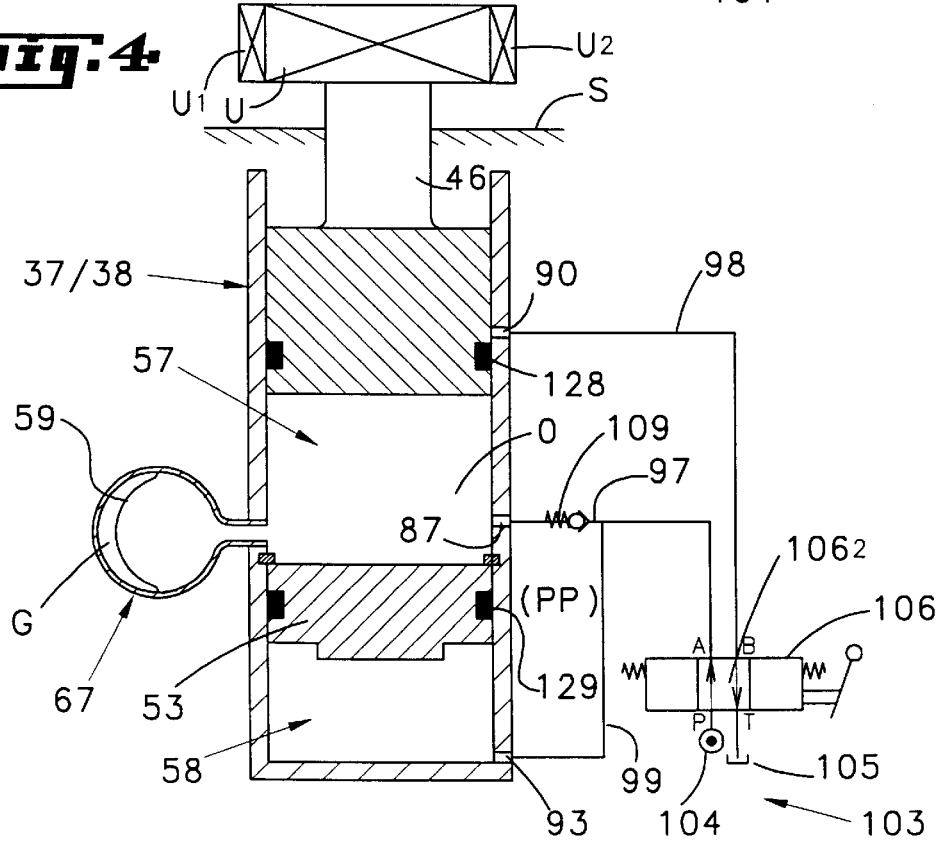
Figure 9:
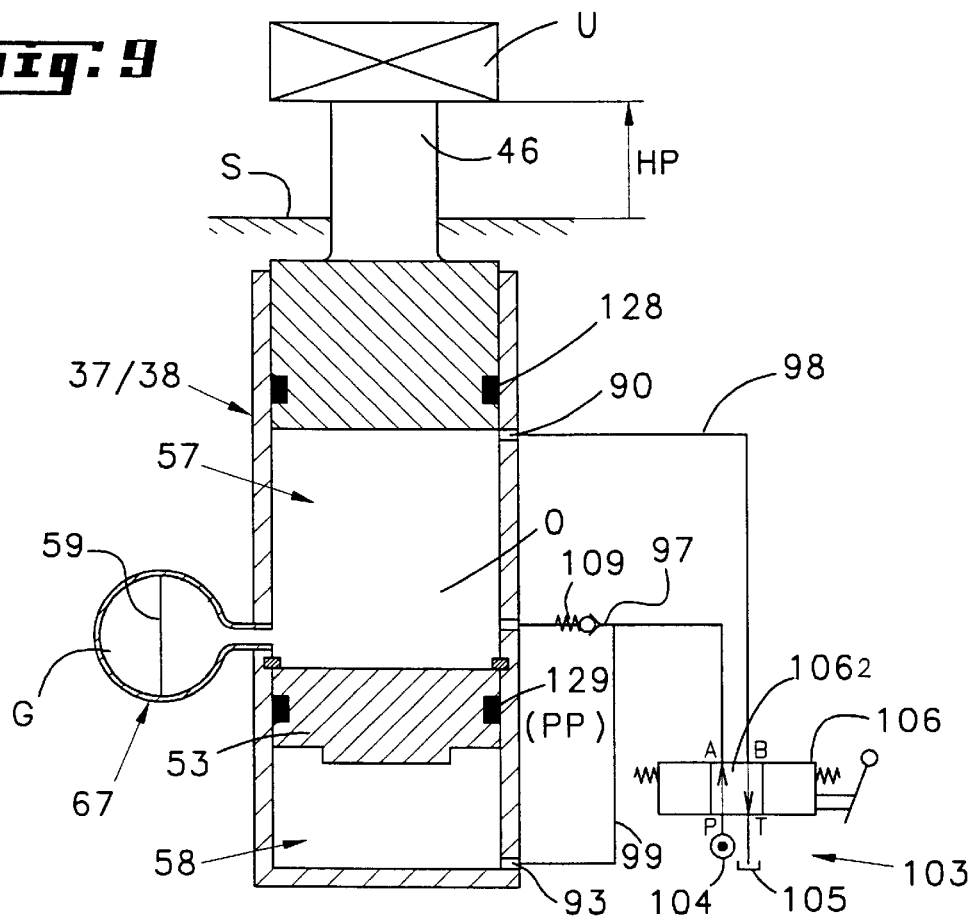

If, during work, the weight of the working unit U is increased—this increase has been represented in FIGS. 4 to 6 by the addition of two masses $U^1$ and $U^2$—the said working unit U will rest more heavily on the ground S until the working unit U is raised the next time (FIGS. 4 and 5) during which raising the lightening will be adjusted.

FIG. 4 illustrates the first phase of the raising. By placing the distributor 106 in the first active position $106^2$, the second hydraulic ram 58 is fed. The oil supplied by the pump 104 moves the piston 53 towards its predetermined position PP. While this is happening, the piston 53 pushes the rod 46 out of the hydraulic-energy converter 37/38 via the oil O contained in the first hydraulic ram 57. Given that the weight of the working unit U is increased, the volume of the gas G in the hydropneumatic accumulator 67 has decreased. Thus, when the piston 53 of the second hydraulic ram 58 reaches its predetermined position PP, the rod 46 of the first hydraulic ram 57 has not yet uncovered the leak-off orifice 90. The second phase of the raising during which the lightening is adjusted begins at this moment. By actually continuing to feed the hydraulic circuit 94, the oil supplied by the pump 104 then enters the first hydraulic ram 57 through the feed orifice 87 given that the means 109 now allows this. The oil which thus enters the first hydraulic ram 57 continues to push the rod 46 out of the hydraulic-energy converter 37/38 until the said rod 46 more or less uncovers the leak-off orifice 90. The working unit U will then again be at the predetermined height HP.

To return to the working position (FIG. 6), the distributor 106 is first of all placed in the second active position $106^3$. The weight of the working unit U expels the oil contained in the second hydraulic ram 58 towards the tank 105 of the oil-supply source 103. The new volume of oil O contained in the first hydraulic ram 57 here, too, remains the same. When the working unit U is resting on the ground S, the distributor 106 is returned to the neutral position 1061. Although the working unit U is heavier, the apparent weight with which it rests on the ground S is once more the same as the initial apparent weight it had when the two masses $U^1$ and $U^2$ were not there.

If the weight of the working unit U were to decrease again, the volume of gas G contained in the hydropneumatic accumulator 67 would increase correspondingly. The working unit U would then rest too lightly on the ground S or, if the working unit U were to return to its initial weight, it would quite simply break contact with the surface of the ground S: this is what is depicted in FIG. 7.

By raising the working unit U the lightening would be adjusted again. To do this, the distributor 106 is placed in the first active position $106^2$. The oil supplied by the pump 104 moves the piston 53 to its predetermined position PP. While this is happening, the piston 53 pushes the rod 46 out of the hydraulic-energy converter 37/38 via the oil O contained in the first hydraulic ram 57. Given that the weight of the working unit U has decreased, the volume of gas G of the hydropneumatic accumulator has increased. Thus the rod 46 already uncovers the leak-off orifice 90, that is to say the working unit U is already at the predetermined height HP while the piston 53 has not yet reached its predetermined position PP: this is what is illustrated in FIG. 8. The continuing movement of the piston 53 towards its predetermined position PP drives oil out of the first hydraulic ram 57 through the leak-off orifice 90, which oil returns to tank 105. When the piston 53 reaches its predetermined position PP, the working unit U is still at the predetermined height HP.

Figure 10:
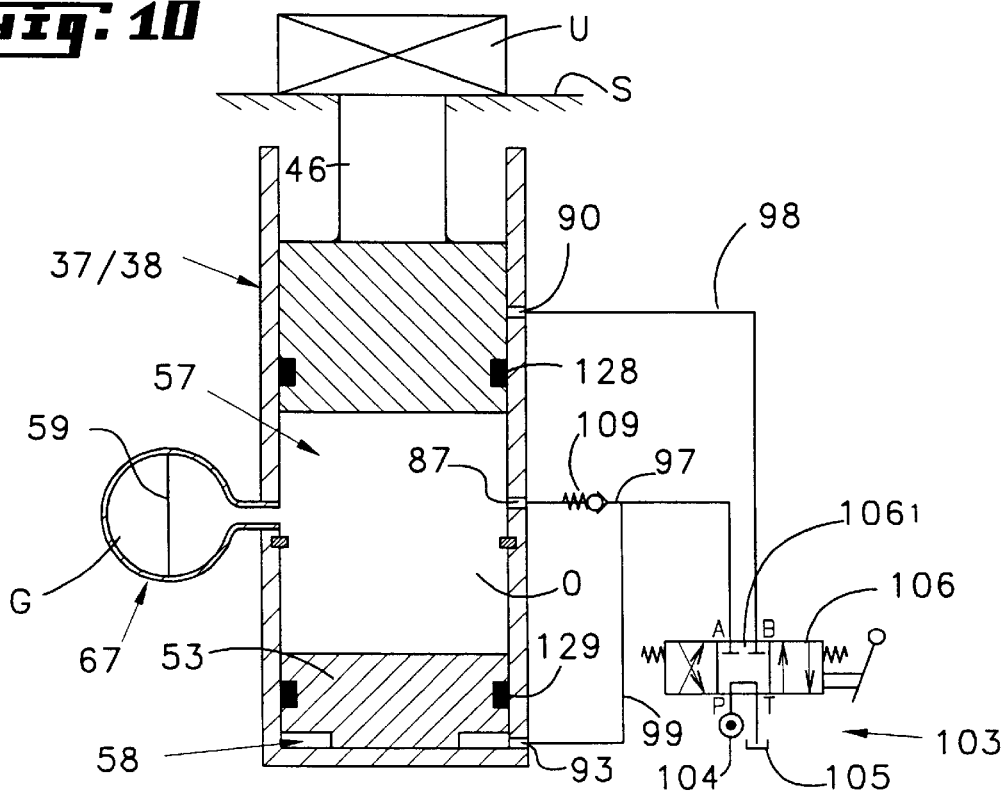

To return to the working position (FIG. 10), the distributor 106 is first of all placed in the second active position $106^3$. The weight of the working unit U expels the oil contained in the second hydraulic ram 58 towards the tank 105 of the oil-supply source 103. The new volume of oil O contained in the first hydraulic ram 57 here, too, remains the same. When the working unit U is resting on the ground S, the distributor 106 is returned to the neutral position $106^1$. Although the working unit U is once more not as heavy as it was before, the apparent weight with which it rests on the ground S is once more the same as the initial apparent weight.

Figure 11:
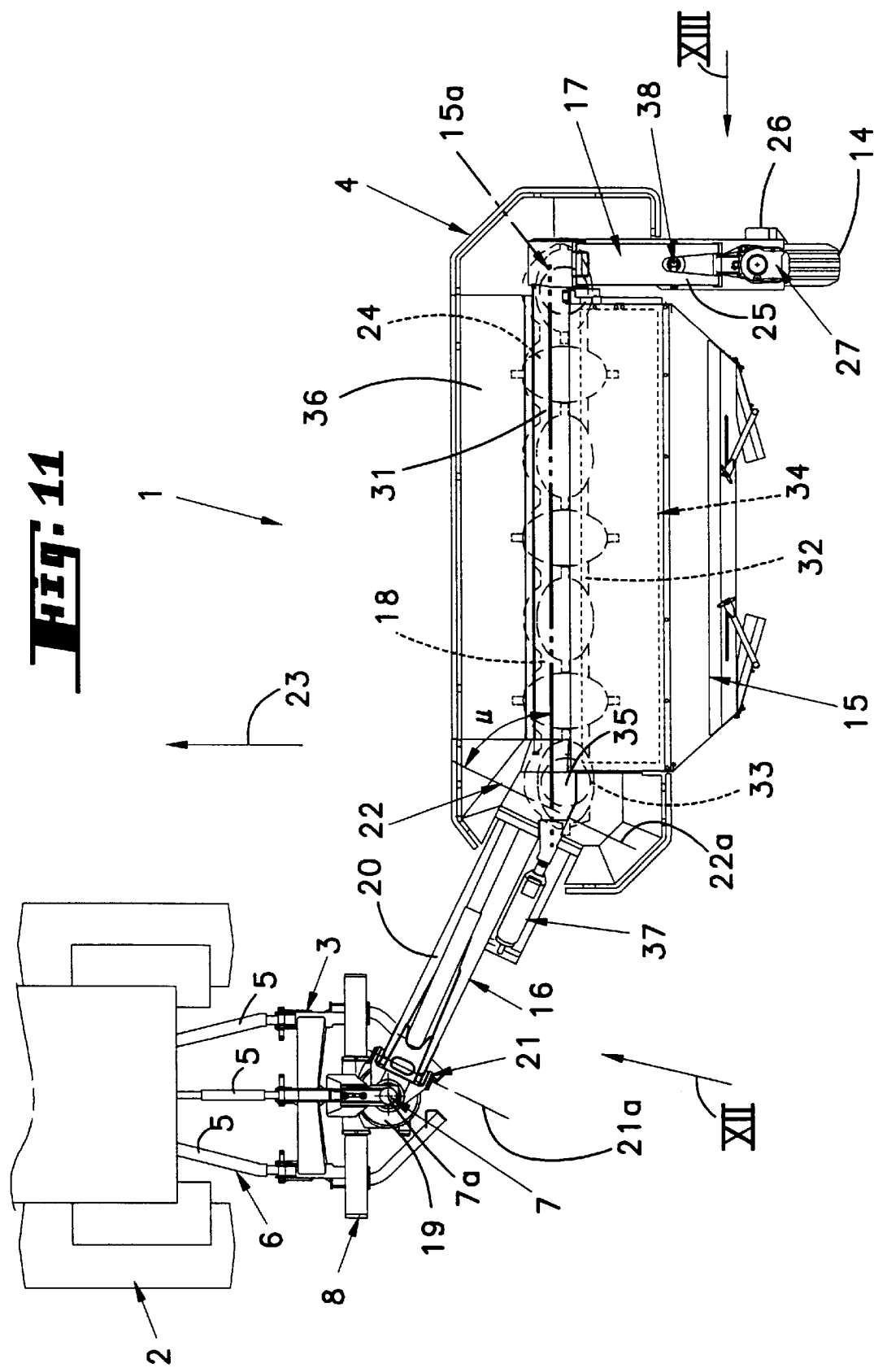
FIG. 11 depicts a view from above of a machine according to the invention, comprising a device for automatically adjusting the lightening of its working unit, employing the method according to the invention.
Figure 12:
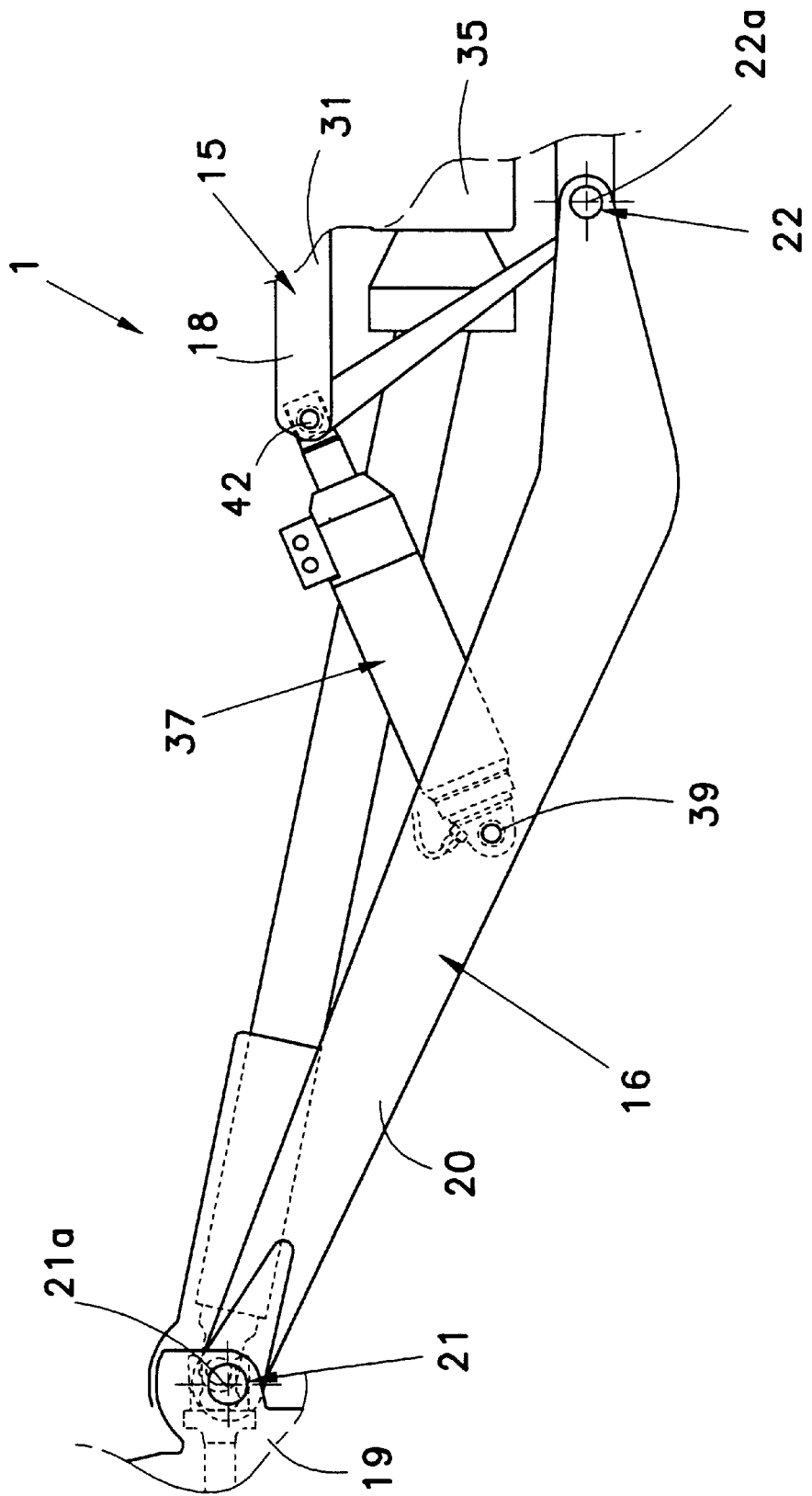
FIG. 12 depicts a view in the direction of arrow XII defined in FIG. 11.
Figure 13:
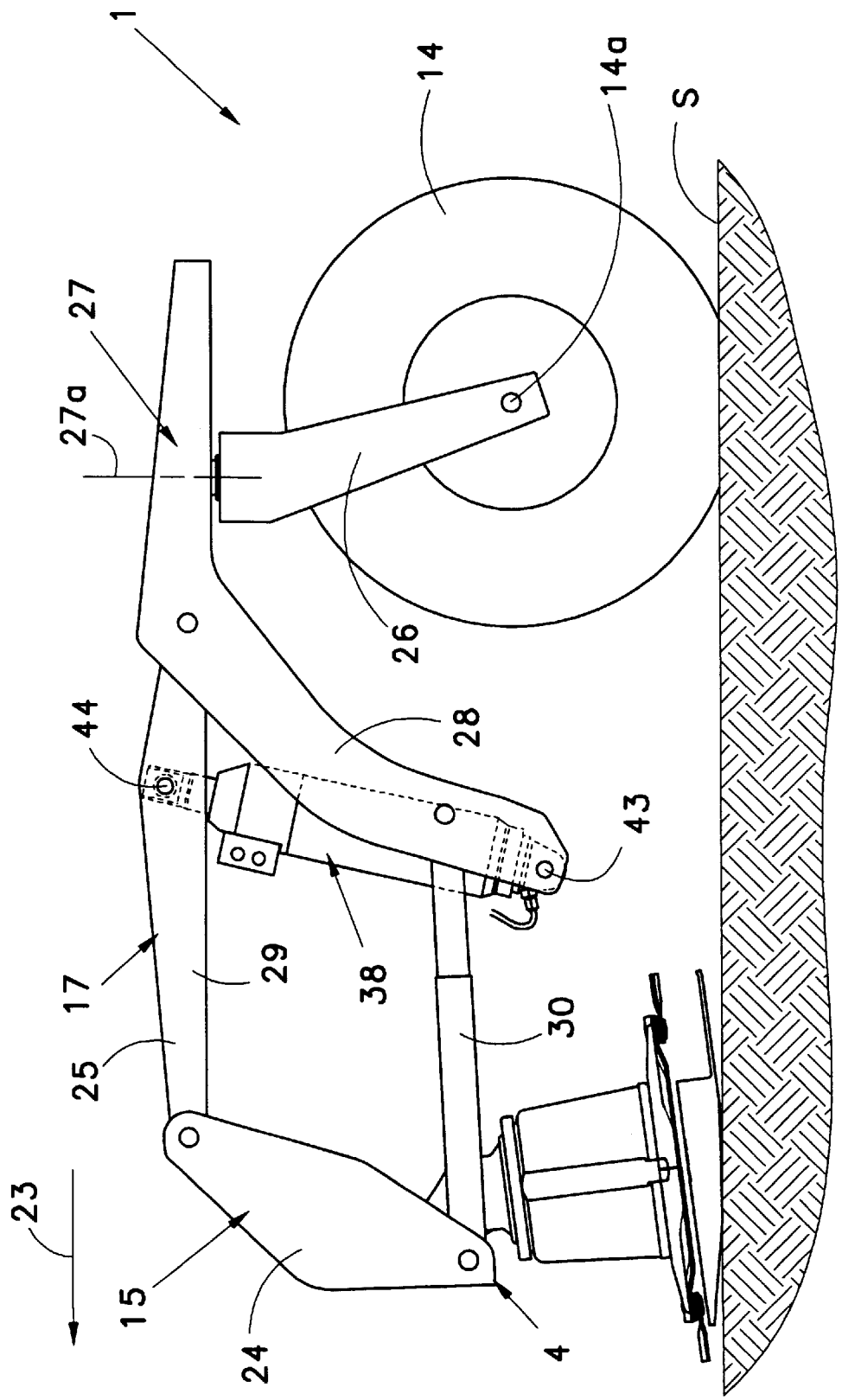
FIG. 13 depicts a view in the direction of arrow XIII defined in FIG. 11.
Figure 14:
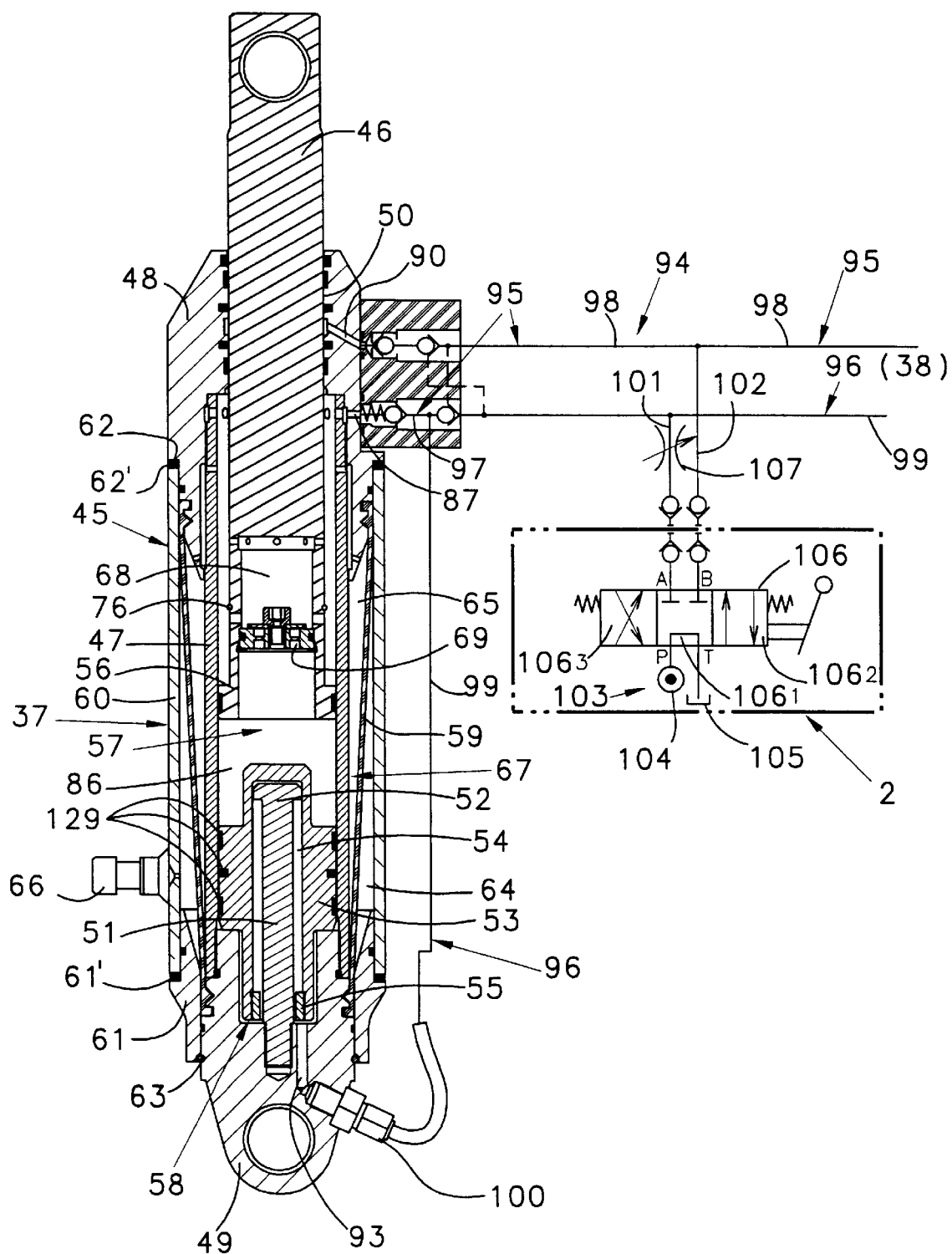
FIG. 14 depicts, in section, the hydraulic-energy converter of a first embodiment of such a device for automatically adjusting the lightening, the said hydraulic-energy converter being in the normal work position.
Figure 15:
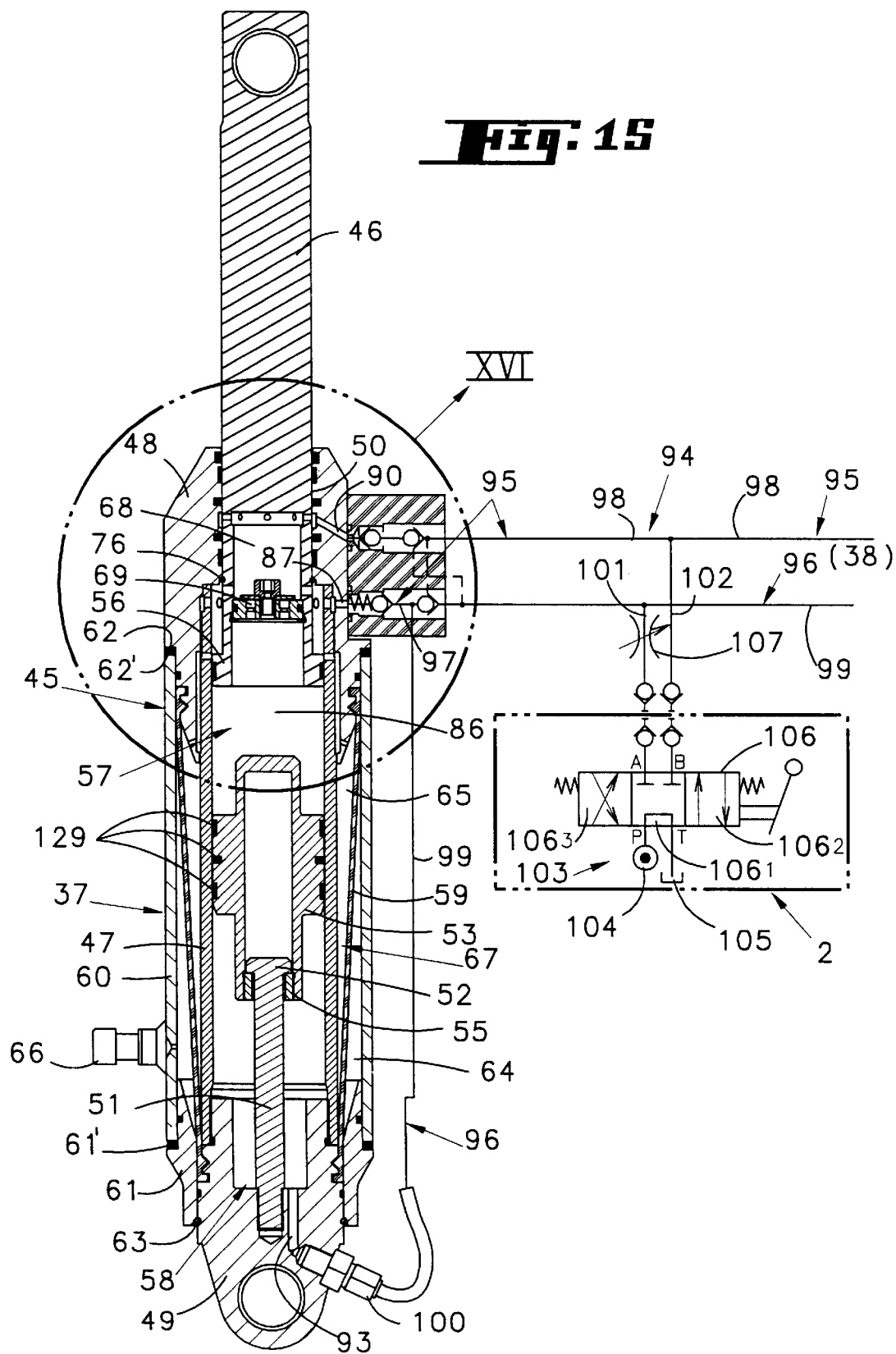
FIG. 15 depicts, in section, the hydraulic-energy converter of FIG. 14, when the working unit is moved away from the said ground.
Figure 16:
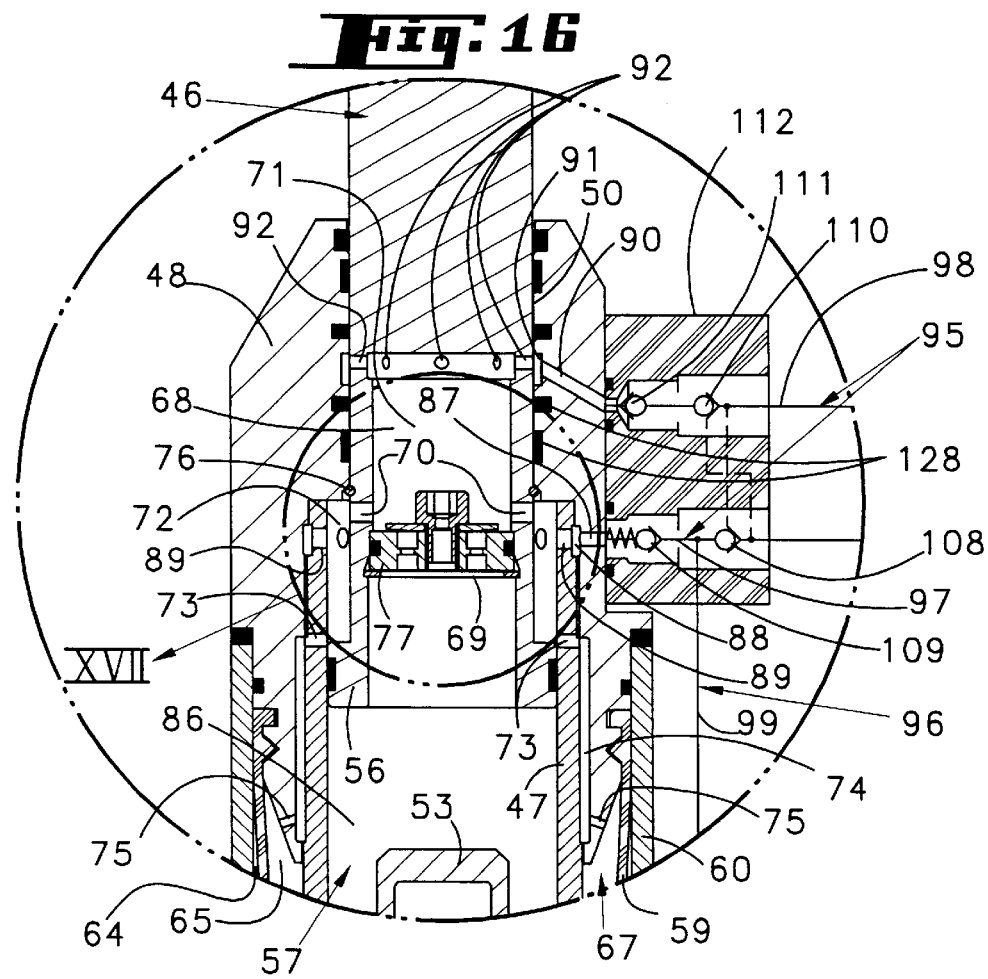
FIG. 16 depicts, on an enlarged scale, region XVI of FIG. 15.
Figure 17:
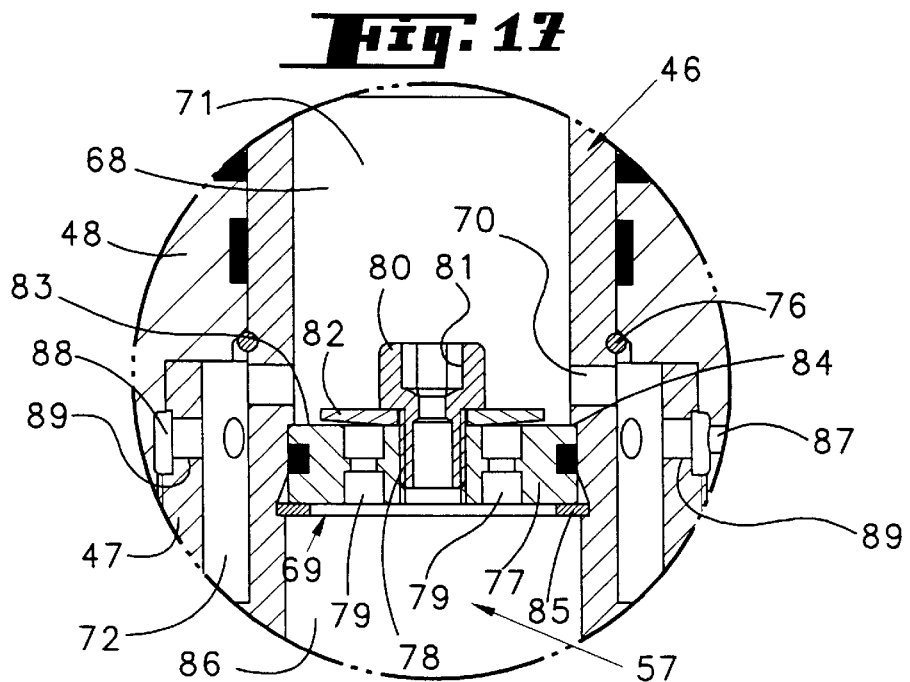
FIG. 17 depicts, on an enlarged scale, region XVII of FIG. 16.

A machine according to the invention is depicted in FIGS. 11 to 13; this is a mower 1 in which the working unit U consists of the harvesting mechanism 15. This mower 1 is similar to the one described in documents EP 0 570 314 A1, EP 0 570 315 A1, EP 0 570 316 A1 and EP 0 579 564 A1, to which reference may be made if need be. In FIG. 11, the mower 1 is depicted hitched to an agricultural tractor 2 and in the work position. It is made up of a hitch structure 3 and of a body 4.

The hitch structure 3 is intended to be connected, at its front part, to the three points 5 of the lift device 6 of the tractor 2. The body 4 is connected to the hitch structure 3 by means of a cylindrical articulation 7 of at least approximately vertical geometric axis 7a. The angular position of the body 4 with respect to the hitch structure 3 can be altered by making the body 4 pivot about the said geometric axis 7a. It is brought into the desired angular position under the action of a hydraulic operating ram 8. The body 4 can thus be brought from a transport position (not depicted) in which it extends longitudinally behind the tractor 2, into the work position (FIG. 11) where it extends at least approximately beside the track of the tractor 2. When the body 4 is in its work position, oil is prevented from flowing from the operating ram 8, and this has the effect of preventing the said body 4 from pivoting about the geometric axis 7a. Conversely, during transport, the operating ram 8 allows free pivoting of the body 4 about the geometric axis 7a. Thus in transport, the body 4 behaves like a trailer, given that it has a wheel 14 situated at its longitudinal end furthest from the hitch structure 3. The device for orientating and locking the wheel 14 in the transport position is not described given that it is clearly explained, particularly in document EP 0 570 314 A1.

The body 4 of the mower 1 moreover comprises the harvesting mechanism 15, two connecting members 16,17 and a device for automatically adjusting the lightening of the harvesting mechanism 15, particularly comprising two hydraulic-energy converters 37,38.

The hitch structure 3, the two connecting members 16,17 and the wheel 14 thus constitute the carrying structure of the harvesting mechanism 15.

The first connecting member 16, which is depicted in greater detail in FIG. 12, connects the first longitudinal end 18 of the harvesting mechanism 15 with the hitch structure 3. For this, the first connecting member 16 is made up of a head 19 mounted so that it can pivot about the geometric axis 7a of the hitch structure 3, and a swinging arm 20 connecting the harvesting mechanism 15 to the said head 19. Thanks to this swinging arm 20, the first longitudinal end 18 of the harvesting mechanism 15 can move heightwise by a substantial amount with respect to the hitch structure 3 so as to follow the relief of the ground S. For this, the swinging arm 20 is connected, at one of its ends, to the head 19 by means of a first pivot connection 21, the geometric axis 21a of which extends at least approximately orthogonally to the longitudinal axis of the swinging arm 20 and the geometric axis 7a. At its other end, the swinging arm 20 is connected to the harvesting mechanism 15 by means of a second pivot connection 22 of geometric axis 22a at least approximately parallel to the geometric axis 21a of the first pivot connection 21. Moreover, the geometric axis 22a of the second pivot connection 22 extends, when viewed in the direction of work 23, at least approximately half way up the harvesting mechanism 15 and, viewed from above, forms an angle μ of about 60° with the longitudinal axis 15a of the said harvesting mechanism 15.

The second connecting member 17 (FIG. 13) connects the second longitudinal end 24 of the harvesting mechanism 15 to the wheel 14. This second connecting member 17 is composed of a deformable quadrilateral 25 and of a member 26 for guiding the wheel 14. The deformable quadrilateral 25 extends, when viewed from above, at least approximately orthogonally to the longitudinal axis 15a of the harvesting mechanism 15. The member 26 for guiding the wheel 14, for its part, is connected to the deformable quadrilateral 25 by means of a cylindrical articulation 27 of at least approximately vertical geometric axis 27a. By means of this arrangement, the second longitudinal end 24 of the harvesting mechanism 15 may, during work, easily move heightwise with respect to the wheel 14 to adapt to the relief of the ground S while allowing the wheel 14 to pivot. The deformable quadrilateral comprises a bracket 28 at the top of which the member 26 for guiding the wheel 14 is articulated, and two connecting rods 29,30 connecting this bracket 28 to the harvesting mechanism 15. This deformable quadrilateral 25 has at least approximately the shape of a parallelogram, of which the side represented by the bracket 28 extends upwards and backwards with respect to the direction of work 23 so as to form a space allowing the wheel 14 to pivot through 360° about the geometric axis 27a.

The harvesting mechanism 15 which extends between the two connecting members 16,17 comprises a carrying beam 31 to which the two connecting members 16,17 are connected. This carrying beam 31 supports a cutter bar 32 fitted with cutting members 33 (discs rotating about upwardly pointing axes and equipped with articulated cutters), and a treatment member 34 intended to treat the product cut by the said cutting members 33. The carrying beam 31 extends at least approximately orthogonally to the direction of work 23 and comprises an input casing 35 used for driving the cutting members 33 and the treatment member 34. The input casing 35 is fitted close to the second pivot connection 22 connecting the first connecting member 16 to the harvesting mechanism 15. The drive to the cutting members 33 and treatment member 34 of the harvesting mechanism 15 is not described given that it is well explained particularly in document EP 0 570 316 A1. The harvesting mechanism 15 also comprises guards 36 which extend around the cutter bar 32 and treatment member 34.

The harvesting mechanism 15 is lightened by means of the device for automatically adjusting the said lightening equipped in particular with two hydraulic-energy converters 37,38, each one associated with a corresponding connecting member 16,17. The first hydraulic-energy converter 37 (FIG. 12) is situated between the swinging arm 20 of the first connecting member 16 and the carrying beam 31 of the harvesting mechanism 15. As can be seen in FIG. 12, the first hydraulic-energy converter 37 is connected on the one hand at least approximately to the middle of the swinging arm 20 by means of an articulation 39 and on the other hand to the carrying beam 31 by means of another articulation 42.

The second hydraulic-energy converter 38 (FIG. 13) extends between the lower part of the bracket 28 of the deformable quadrilateral 25, to which it is connected by means of an articulation 43 and the top connecting rod 29 of the said deformable quadrilateral 25, to which connecting rod it is connected by means of another articulation 44.

Various embodiments of devices for automatically adjusting the lightening of the harvesting mechanism 15 of the mower 1 are described below.

The various identical elements which make up these devices will be described just once and will keep the same reference number throughout the description.

Figure 24:
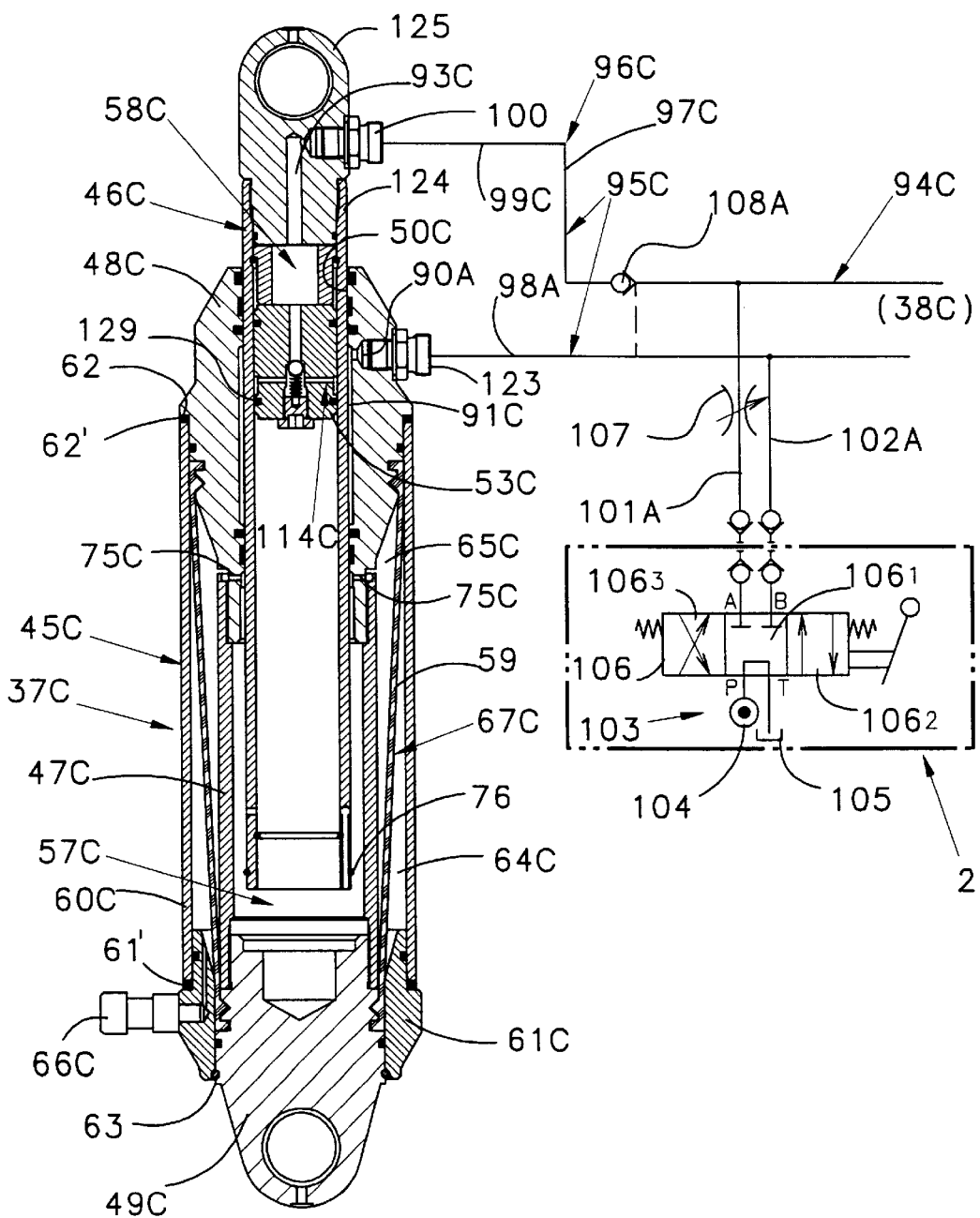
FIG. 24 depicts, in section, the hydraulic-energy converter of a fourth embodiment of a device for automatically adjusting the lightening, the said hydraulic-energy converter being in the normal work position.
Figure 25:
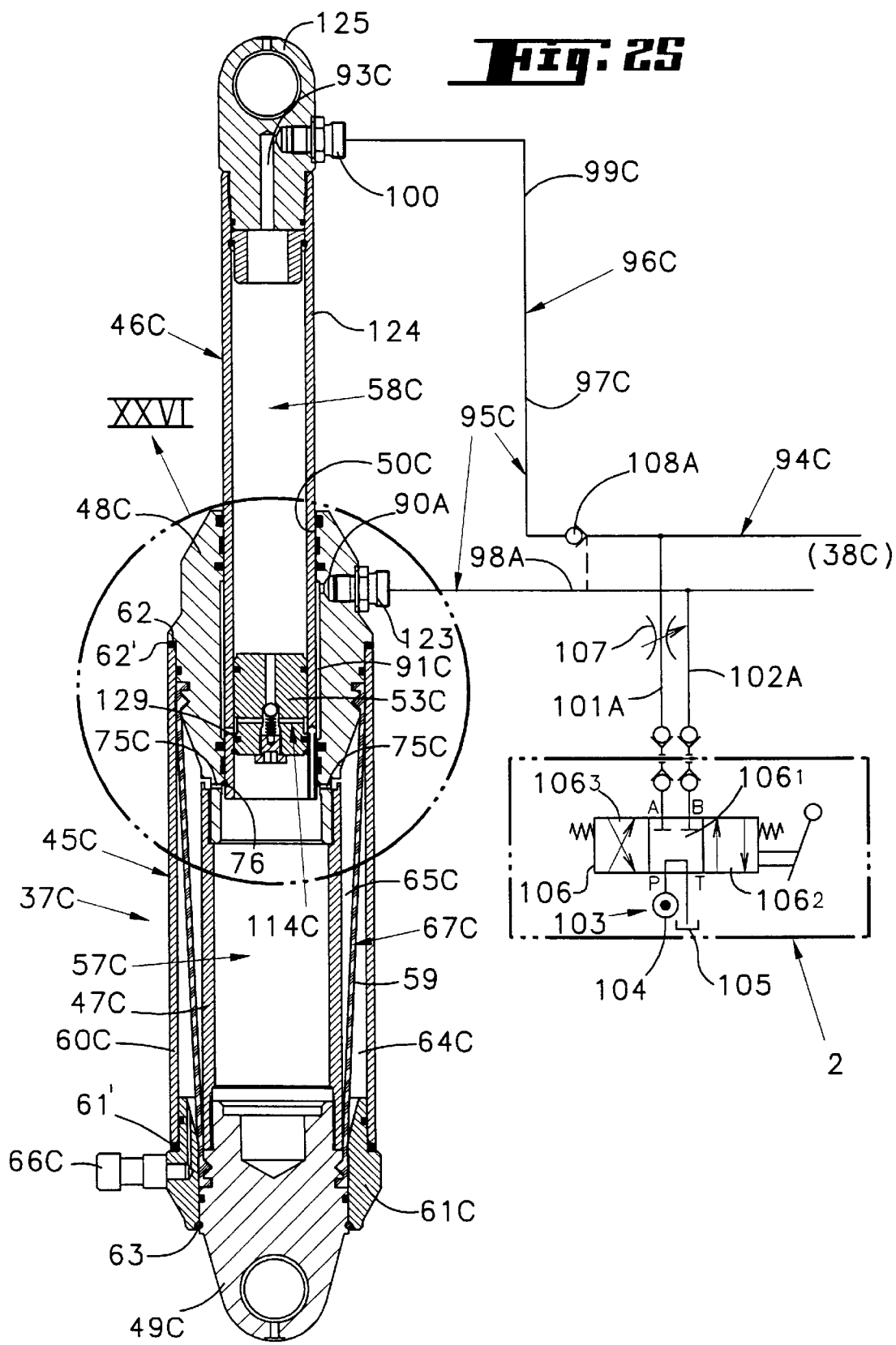
FIG. 25 depicts, in section, the hydraulic-energy converter of FIG. 24 when the working unit is moved away from the ground.
Figure 26:
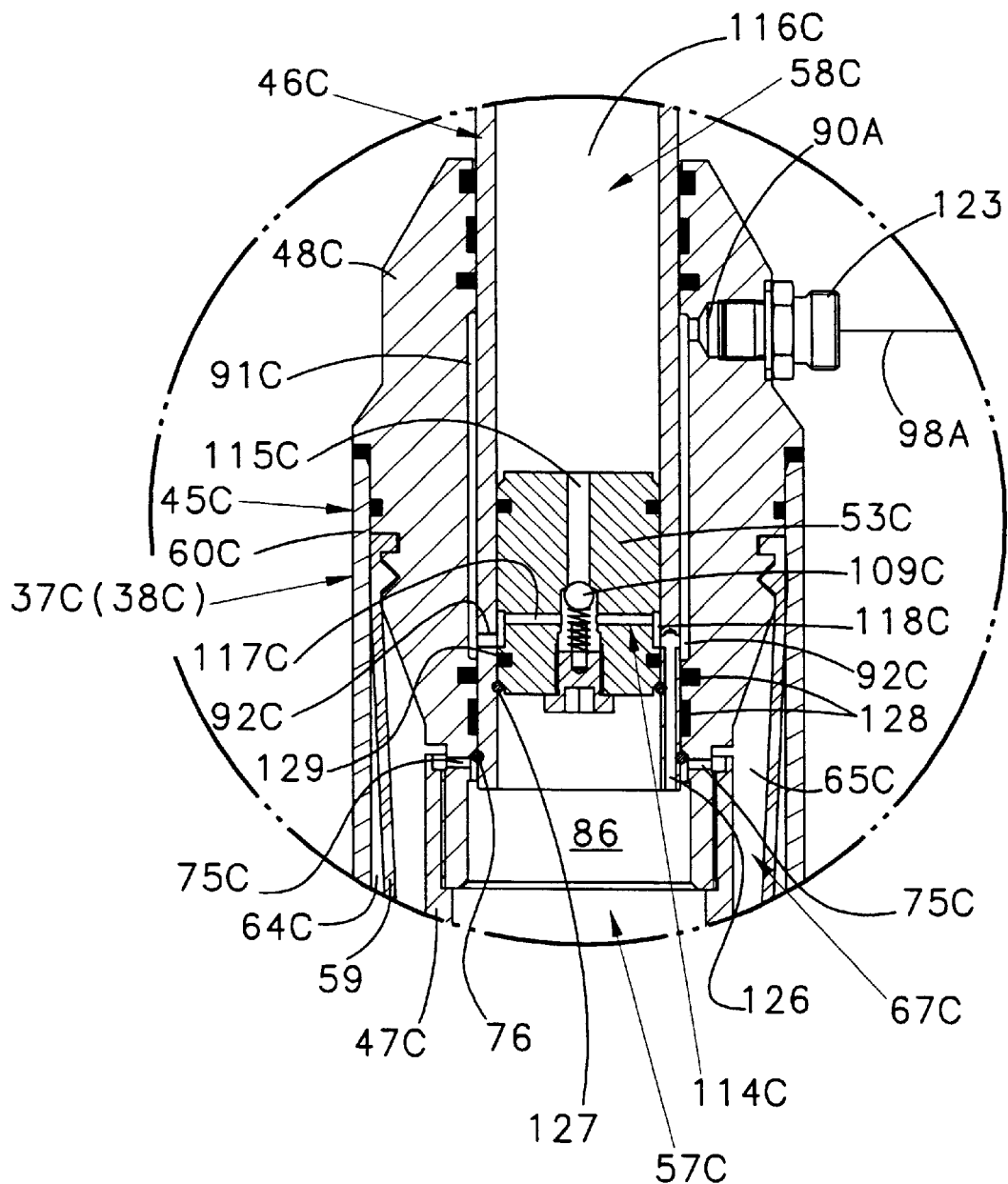
FIG. 26 depicts, on an enlarged scale, region XXVI of FIG. 25.

These devices also contain a certain number of elements which are similar as regards their function(s). These similar elements will be given the same reference numeral followed by the letter A (FIGS. 20 to 22), B (FIG. 23) and C (FIGS. 24 to 26).

FIGS. 14 to 17 show a first embodiment of a device for automatically adjusting the lightening of the harvesting mechanism 15 of the mower 1.

The hydraulic-energy converters 37,38 with which this device is equipped each comprise a body 45 and a rod 46. The body 45 first of all comprises an inner cylinder 47 to the end on the same side as the rod 46 of which is screwed a piece 48 for closing the body 45 and guiding the rod 46, and to the other end of which is screwed a closing piece 49. The closing and guiding piece 48 has a bore 50 for the passage and guidance of the said rod 46. The closing piece 49 for its part has a tie rod 51 which is screwed into the said closing piece 49 and at its free end has a shoulder 52. This tie rod 51 extends coaxially inside a piston 53 which for this purpose has a bore 54 which is blind and closed at its end through which the said tie rod 51 enters by a closing ring 55 screwed into the said end. This piston 53, which is of the plunger type, is intended to slide inside the inner cylinder 47.

That end of the rod 46 which extends inside the inner cylinder 47 also has a piston 56.

Thus, each hydraulic-energy converter 37,38 comprises a first hydraulic ram 57 essentially formed by the inner cylinder 47, the plunger piston 53, the rod 46 equipped with its piston 56 and the closing and guiding piece 48. It also comprises a second hydraulic ram 58 formed by the inner cylinder 47, the plunger piston 53 and the closing piece 49.

Each hydraulic-energy converter 37,38 also comprises a deformable membrane 59 of conical shape which extends between the closing and guiding piece 48 and the closing piece 49 on which pieces it is mounted. The hydraulic-energy converter 37,38 also comprises an outer cylinder 60 and a closing-off ring 61 which are mounted on the closing and guiding piece 48 and the closing piece 49, covering the deformable membrane 59. The outer cylinder 60 and the closing-off ring 61 are held in place between a shoulder 62 of the closing and guiding piece 48 and a stop ring 63 mounted on the closing piece 49 after the insertion of a seal 61' and a seal 62' respectively between the closing-off ring 61 and the outer cylinder 60, and between the latter and the shoulder 62 of the closing and guiding piece 48, respectively. The deformable membrane 59 thus divides the space between the inner cylinder 47, the outer cylinder 60, the closing and guiding piece 48 and the closing-off ring 61 into two volumes: an outer volume 64 delimited by the outer cylinder 60, the closing-off ring 61 and the deformable membrane 59, and an inner volume 65 delimited by the said deformable membrane 59, the closing and guiding piece 48 and the inner cylinder 47. The outer volume 64 is intended to contain a gas, preferably nitrogen. For this, the outer cylinder 60 is provided with an inflation valve 66 which allows the volume of gas needed to be let in. The inner volume 65 for its part is intended to contain oil, the pressure of which is identical to the pressure of the oil contained in the first hydraulic ram 57. This outer volume 64 containing a gas under pressure and this inner volume 65 containing oil under pressure thus constitute the hydropneumatic accumulator 67 associated with the first hydraulic ram 57. The hydropneumatic accumulator 67 is thus integrated into the hydraulic-energy converter 37,38 and surrounds the first hydraulic ram 57 and the second hydraulic ram 58.

In the example depicted, the hydraulic connection between the first hydraulic ram 57 and the hydropneumatic accumulator 67 is produced as follows. The rod 46 at its end that extends into the first hydraulic ram 57 has a hollow part 68 in the middle of which there is a damper 69 which will be described in detail later. Made in the rod 46 is at least one first hole 70 which makes the space 71 of the hollow part 68 situated beyond the damper 69 communicate with the small chamber 72 of the first hydraulic ram 57. The inner cylinder 47, for its part, has at least one first hole 73 which makes the said small chamber 72 of the first hydraulic ram 57 communicate with a first collector volume 74 formed between the said inner cylinder 47 and the closing and guiding piece 48. This closing and guiding piece 48 finally has at least one first hole 75 which makes the first collector volume 74 communicate with the inner volume 65 of the hydropneumatic accumulator 67. The deployment of the rod 46 of the hydraulic-energy converter 37,38 is limited by a stop ring 76 mounted on the said rod 46 and butting against the closing and guiding piece 48. The first hole(s) 73 in the inner cylinder 47 is(are) positioned in such a way that it(they) is(are) not completely closed off by the piston 56 of the rod 46 when the latter is in its position of maximum deployment.

The damper 69 consists of a disc 77 in which there are made a threaded central hole 78 and a certain number of holes 79 arranged around the said central hole 78. A hollow screw 80 with a hole 81 in its centre is screwed into the threaded central hole 78 after insertion of a concave washer 82 which extends inside the space 71 of the hollow part 68 of the rod 46 between the said hollow screw 80 and the corresponding face 83 of the disc 77, with the concaveness pointing towards the said face 83 of the disc 77. Viewed in the direction of the axis of the hollow screw 80, the concave washer 82 completely covers the holes 79. Viewed in section, it becomes clear, however, that because of the concaveness of the concave washer 82, the said holes 79 are not covered. The damper 69 thus preassembled is mounted in the hollow part 68 of the rod 46 and held in place therein by a shoulder 84 made in the said hollow part 68, and a stop ring 85. Thanks to this damper 69, the oil contained in the first hydraulic ram 57 circulates more quickly in the large chamber 86 of the said first hydraulic ram 57/space 71 of the hollow part 68 of the rod 46 direction than in the opposite direction. This is because in the first direction the oil flows through the hole 81 of the hollow screw 80 and the holes 79 made in the disc 77. In the other direction, however, the concave washer 82 appreciably slows down the flow of oil through the holes 79 and the oil flows practically only through the hole 81 in the hollow screw 80. Thus the deployment of the rod 46 out of the hydraulic-energy converter 37,38 is slowed down more than its retraction into this converter. What this means is that the rise of the harvesting mechanism 15 is slowed down more than its fall.

Figure 18:
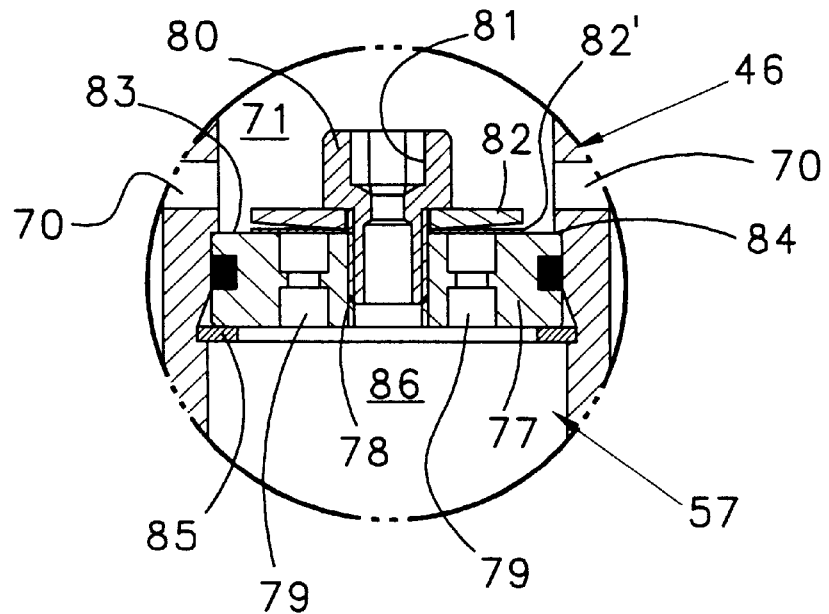
FIGS. 18 and 19 depict, on an enlarged scale, another embodiment of the damper equipping the hydraulic-energy converter of FIGS. 14 to 17.
Figure 19:
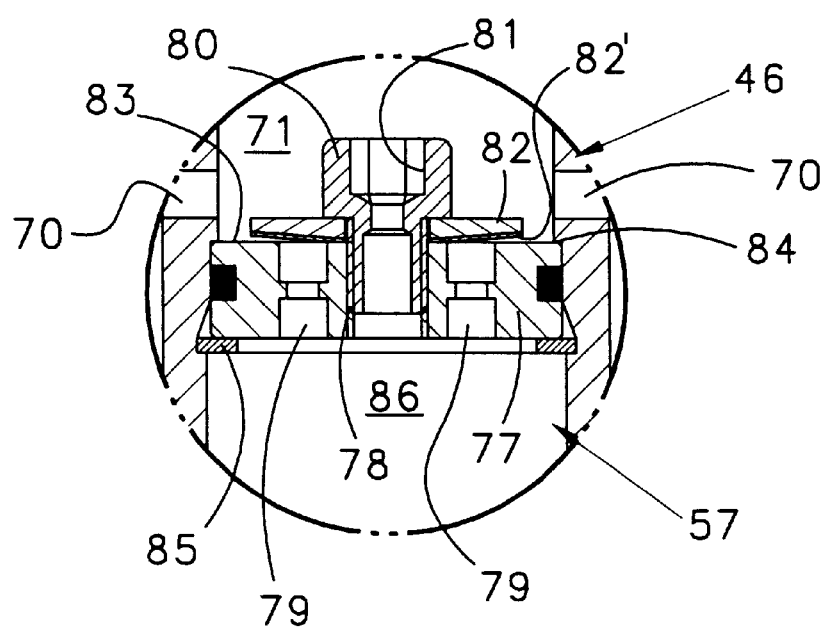

In another solution (FIGS. 18 and 19), it is even possible to envisage inserting one (or more) elastic washer(s) 82' between the face 83 of the disc 77 and the concave washer 82. Under the effect of the pressure of the oil, this(these) elastic washer(s) 82' will allow oil to flow through the holes 79 in the large chamber 86 of the first hydraulic ram 57/space 71 of the hollow part 68 of the rod 46 direction (FIG. 19), but not in the opposite direction (FIG. 18).

The first hydraulic ram 57 is fed through a feed orifice 87 made in the closing and guiding piece 48. This feed orifice 87 opens into a second collector volume 88 formed between the inner cylinder 47 and the closing and guiding piece 48. The inner cylinder 47, for its part, has at least one second hole 89 which makes the second collector volume 88 communicate with the small chamber 72 of the first hydraulic ram 57, which small chamber 72 itself communicates with the large chamber 86 of the first hydraulic ram 57 through the first hole(s) 70 made in the rod 46 and opening into the space 71 of the hollow part 68 of the said rod 46 and through the damper 69.

Each hydraulic-energy converter 37,38 also has a leak-off orifice 90 made in the closing and guiding piece 48 and which opens into a third collector volume 91 formed between the closing and guiding piece 48 and the rod 46. The latter, for its part, has at least one second hole 92 which makes the space 71 of the hollow part 68 of the rod 46 communicate with the third collector volume 91.

The second hydraulic ram 58 is fed through a partially threaded feed orifice 93 made in the closing piece 49.

This first device for automatically adjusting the lightening of the harvesting mechanism 15 of the mower 1 also comprises a hydraulic circuit 94 feeding the two hydraulic-energy converters 37,38. This hydraulic circuit 94 comprises, for each hydraulic-energy converter 37,38, a first hydraulic system 95 coupled to the first hydraulic ram 57 and a second hydraulic system 96 coupled to the second hydraulic ram 58 of the said hydraulic-energy converter 37,38.

The first hydraulic system 95 has a first hydraulic passage 97 connected to the feed orifice 87 of the first hydraulic ram 57, and a second hydraulic passage 98 connected to the leak-off orifice 90 of the said first hydraulic ram 57.

The second hydraulic system 96 for its part has a third hydraulic passage 99 connected to the feed orifice 93 of the second hydraulic ram 58. The third hydraulic passage 99 is provided, for this purpose, with a threaded connector 100 screwed into the screw thread of the feed orifice 93 of the second hydraulic ram 58. The first hydraulic passage 97, for its part, is coupled to the third hydraulic passage 99. Furthermore, in this embodiment, the two third hydraulic passages 99 are connected to a first common feedpipe 101 and the two second hydraulic passages 98 are connected to a second common feedpipe 102. This first common feedpipe 101 and this second common feedpipe 102 are coupled to the oil-supply source 103 which comprises the pump 104, the tank 105 and the distributor 106. More specifically, the first common feedpipe 101 is coupled to the third orifice A of the distributor 106 and the second common feedpipe 102 is coupled to the fourth orifice B of the said distributor 106. In this instance, the said oil-supply source 103 is the one that exists on the agricultural tractor 2 to which the mower 1 is hitched. It is moreover clear that the first common feedpipe 101 is provided, downstream of the distributor 106, with a throttle valve 107 of the adjustable type. It goes without saying that instead of this common throttle valve 107, a throttle valve of this kind could be provided on each of the first hydraulic passages 97 or on each of the third hydraulic passages 99 upstream of the coupling of the corresponding first hydraulic passage 97.

Each third hydraulic passage 99 also comprises a first controlled non-return valve 108 preventing oil from circulating in the hydraulic-energy converter 37,38/oil-supply source 103 direction and provided upstream of the coupling of the first hydraulic passage 97 to the third hydraulic passage 99.

Each first hydraulic passage 97 for its part comprises a preloaded non-return valve 109 allowing, under certain conditions, oil to circulate in the oil-supply source 103/first hydraulic ram 57 direction but preventing oil from circulating in the opposite direction.

Each second hydraulic passage 98 for its part comprises a second controlled non-return valve 110 preventing oil from circulating in the first hydraulic ram 57/oil-supply source 103 direction and, downstream of this second controlled non-return valve 110, a non-return valve 111 that prevents oil from circulating in the oil-supply source 103/first hydraulic ram 57 direction. The opening of the first controlled non-return valve 108 and of the second controlled non-return valve 110, respectively, is controlled by the pressure prevailing in the second hydraulic passage 98 upstream of the second controlled non-return valve 110 and by the pressure prevailing in the third hydraulic passage 99 upstream of the first controlled non-return valve 108, respectively. These two controlled non-return valves 108,110, the preloaded non-return valve 109 and the non-return valve 111 are advantageously housed in a hydraulic unit 112 fixed to the closing and guiding piece 48.

The way in which this first embodiment of a device for automatically adjusting the lightening of the harvesting mechanism 15 of the mower 1 works is entirely in accordance with the operating principle explained earlier.

In the working position, the harvesting mechanism 15 rests on the ground S with a certain apparent weight and can follow the relief of the said ground S.

When the harvesting mechanism 15 passes over an elevation of the ground S at least one of the two hydraulic-energy converters 37,38 has to lengthen. This means that the rod 46 emerges from the body 45 of the said hydraulic-energy converter 37,38. As this happens, oil contained in the inner volume 65 of the hydropneumatic accumulator 67 is transferred into the first hydraulic ram 57 through the first hole(s) 75 in the closing and guiding piece 48, the first hole(s) 73 in the inner cylinder 47, the first hole(s) 70 in the rod 46 and essentially the hole 81 in the hollow screw 80 of the damper 69. The reduction in volume of the oil contained in the inner volume 65 of the hydropneumatic accumulator 67 is compensated for by the increase in volume of the gas contained in the outer volume 64 of the said hydropneumatic accumulator 67.

When on the other hand the harvesting mechanism 15 drops into a dip in the ground S, at least one of the hydraulic-energy converters 37,38 shortens. What this means is that the rod 46 is retracted into the body 45 of the said hydraulic-energy converter 37,38. As this happens, oil contained in the first hydraulic ram 57 is transferred into the inner volume 65 of the hydropneumatic accumulator 67 through the holes 79 and the hole 81 in the damper 69, the first hole(s) 70 in the rod 46, the first hole(s) 73 in the inner cylinder 47 and the first hole(s) 75 in the closing and guiding piece 48. The increase in volume of the oil contained in the inner volume 65 of the hydropneumatic accumulator 67 is compensated for by the reduction in volume of the gas contained in the outer volume 64 of the said hydropneumatic accumulator 67.

To raise the harvesting mechanism 15, the distributor 106 is placed in its first active position $106^2$. The oil supplied by the pump 104 flows into the first common feedpipe 101 (it enters the latter through the throttle valve 107), into the third hydraulic passages 99 (it enters these through the first corresponding controlled non-return valve 108) and enters the second hydraulic ram 58 of each hydraulic-energy converter 37,38. By entering each second hydraulic ram 58 it moves the corresponding piston 53 towards the predetermined position thereof which is defined by the shoulder 52 of the tie rod 51. As this happens, the said piston 53 causes the corresponding rod 46 to emerge by means of the oil contained in the corresponding first hydraulic ram 57.

If the weight of the harvesting mechanism 15 has not varied since the last raising operation, the piston 53 comes into abutment on the shoulder 52 of the tie rod 51 and the second hole(s) 92 in the rod 46 comes(come) level with the third collector volume 91 (which is in communication with the leak-off orifice 90) simultaneously.

With feed continuing, the oil supplied by the pump 104 passes through the preloaded non-return valve 109, the feed orifice 87, the second hole(s) 89 in the inner cylinder 47, the first hole(s) 70 in the rod 46, the second hole(s) 92 in the rod 46 and the leak-off orifice 90, then returns to tank 105 through the second hydraulic passage 98 (where it passes through the non-return valve 111 and the second controlled non-return valve 110) and the second common feedpipe 102.

If the weight of the harvesting mechanism 15 has increased since the last raising operation, the piston 53 comes into abutment on the shoulder 52 of the tie rod 51 while the second hole(s) 92 in the rod 46 have not yet reached the third collector volume 91. With feed continuing, the oil supplied by the pump 104 passes through the preloaded non-return valve 109, the feed orifice 87, the second hole(s) 89 in the inner cylinder 47, the first hole(s) 70 in the rod 46 and enters the large chamber 86 of the first hydraulic ram 57 essentially through the hole 81 in the hollow screw 80 of the damper 69. This oil which enters the said large chamber 86 of the first hydraulic ram 57 continues to deploy the rod 46 out of the body 45 until the second hole(s) 92 in the rod 46 reaches(reach) the third collector volume 91. The deployment of the rod 46 then stops and any surplus oil entering the first hydraulic ram 57 returns to tank 105 as explained above.

If the weight of the harvesting mechanism 15 has decreased since the last raising operation, the second hole(s) 92 in the rod 46 reaches(reach) the third collector volume 91 while the piston 53 has not yet reached the shoulder 52 of the tie rod 51. As the deployment of the rod 46 is then stopped, the continuing movement of the piston 53 drives the surplus oil contained in the large chamber 86 of the first hydraulic ram 57 through the holes 79,81 in the damper 69, after which any surplus oil entering the first hydraulic ram 57 returns to tank 105 as explained above.

In order to lower the harvesting mechanism 15, the distributor 106 is placed in the second active position 106³. The weight of the harvesting mechanism 15 then drives the oil contained in the second hydraulic ram 58 out of the latter via the rod 46 and its piston 56, the oil contained in the first hydraulic ram 57 and the piston 53. This driven-out oil returns to tank 105 through the third hydraulic passage 99 (where it passes through the first controlled non-return valve 108) and the first common feedpipe 101. The retraction of the rod 46 into the body 45 of the corresponding hydraulic-energy converter 37,38 is stopped when the harvesting mechanism 15 comes into contact with the ground S. It should be noted that the volume of oil contained in the first hydraulic ram 57 is maintained by the preloaded non-return valve 109 as the harvesting mechanism 15 falls.

The two controlled non-return valves 108 and 110 do not directly form part of the device for automatically adjusting the lightening of the harvesting mechanism 15. They are merely safety elements which prevent oil from getting out of the corresponding energy converter 37,38 when the harvesting mechanism 15 is in the raised transport position. The same is true of the non-return valve 111 which merely ensures that the pressure in the corresponding second hydraulic passage 98 rises correctly when the distributor 106 is placed in its second active position 106³. This correct rise in pressure in the second hydraulic passage 98 ensures that the first controlled non-return valve 108 opens.

Figure 20:
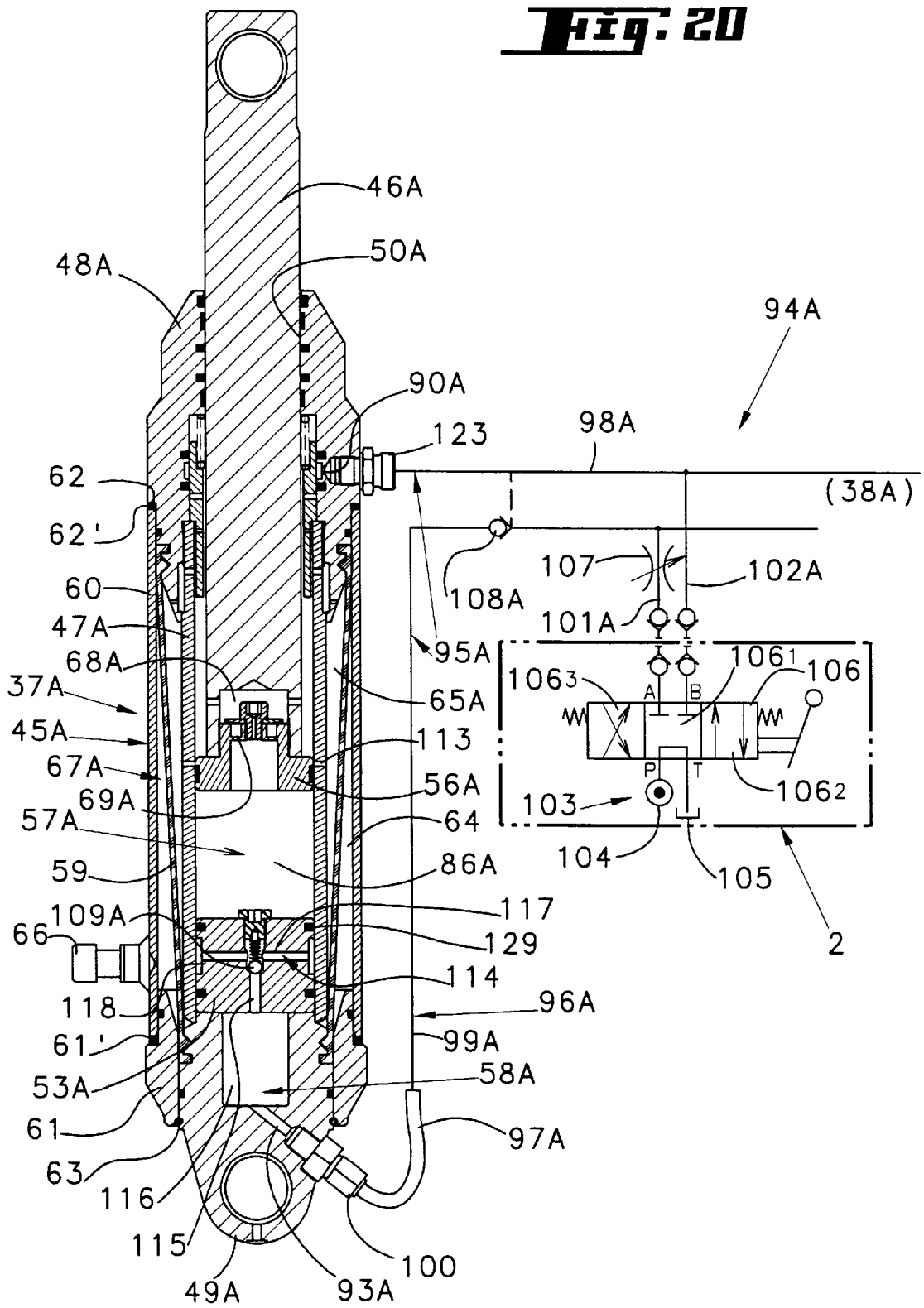
FIG. 20 depicts, in section, the hydraulic-energy converter of a second embodiment of a device for automatically adjusting the lightening, the said hydraulic-energy converter being in the normal work position.
Figure 21:
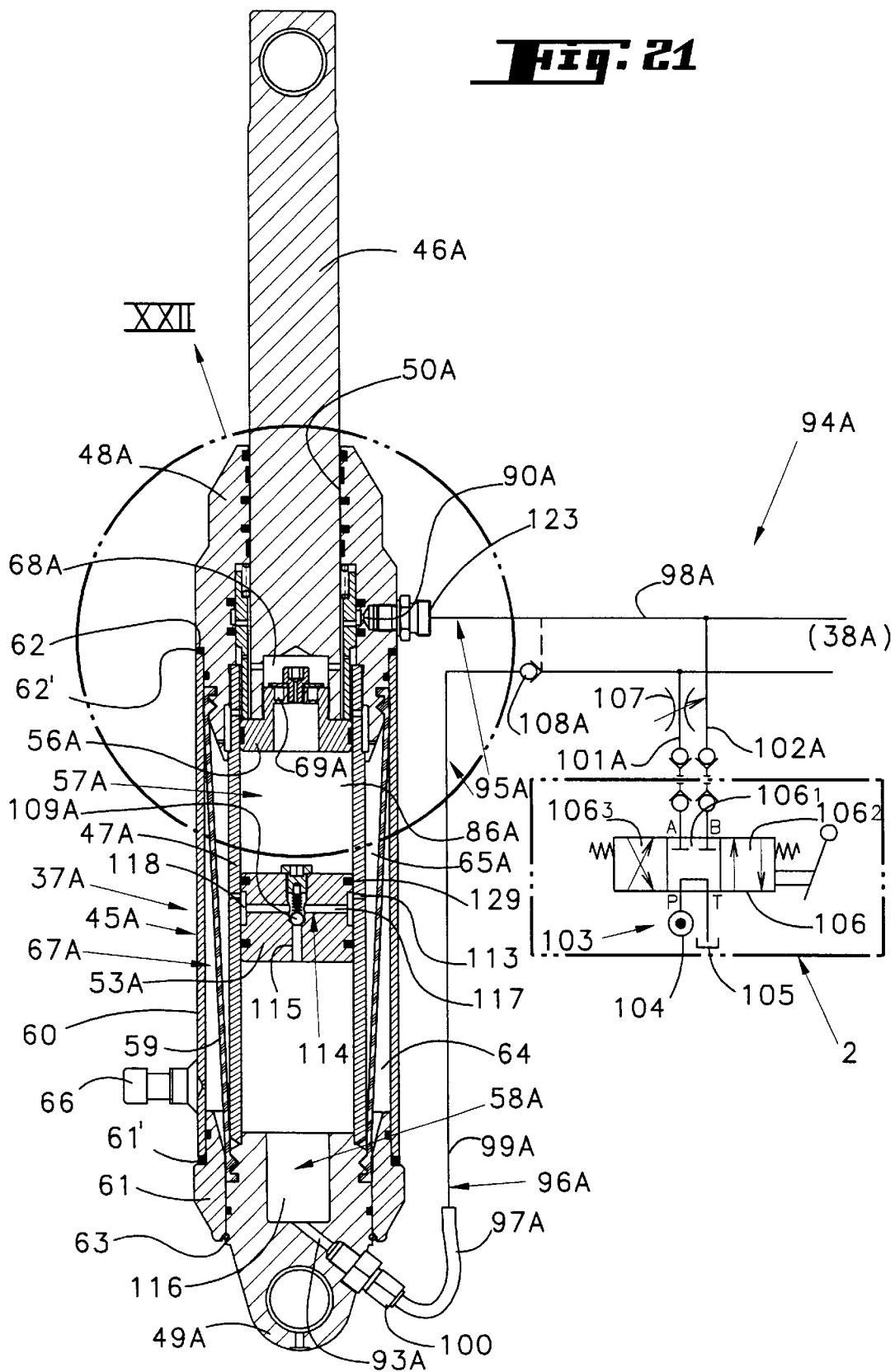
FIG. 21 depicts, in section, the hydraulic-energy converter of FIG. 20 when the working unit is moved away from the ground.
Figure 22:
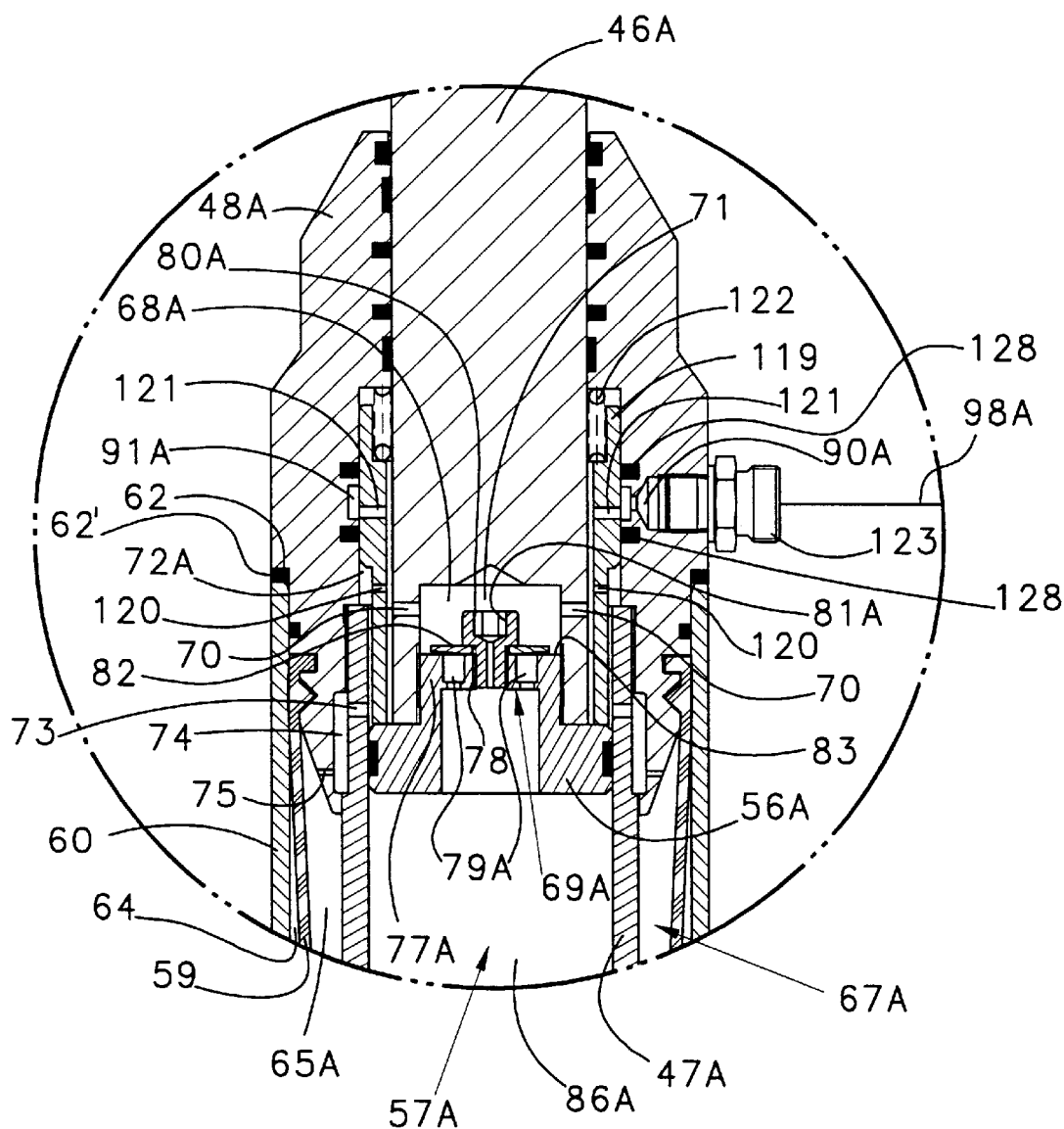
FIG. 22 depicts, on an enlarged scale, region XXII of FIG. 21.

FIGS. 20 to 22 show a second embodiment of a device for automatically adjusting the lightening of the harvesting mechanism 15 of the mower 1.

Each hydraulic-energy converter 37A,38A of this device comprises a body 45A and a rod 46A. The body 45A first of all has a cylinder 47A, to the end of the same side as the rod 46A of which is screwed a piece 48A for closing the body 45A and guiding the rod 46A, and to the other end of which is welded a closing piece 49A. The closing and guiding piece 48A has a bore 50A for the passage and guiding of the said rod 46A. A piston 53A of the plunger type is intended to slide inside the inner cylinder 47A.

That end of the rod 46A which extends inside the inner cylinder 47A also has a piston 56A which is screwed into a hollow part 68A of the rod 46A.

Thus, each hydraulic-energy converter 37A,38A has a first hydraulic ram 57A formed essentially by the inner cylinder 47A, the plunger piston 53A, the rod 46A equipped with its piston 56A and the closing and guiding piece 48A. It also comprises a second hydraulic ram 58A formed by the inner cylinder 47A, the plunger piston 53A and the closing piece 49A.

Apart from the inner cylinder 47A, each hydraulic-energy converter 37A,38A also comprises the deformable membrane 59 and the outer cylinder 60 and the closing-off ring 61 which form the outer volume 64 containing the gas. The deformable membrane 59 also forms, together with the inner cylinder 47A and the closing and guiding piece 48A, the inner volume 65A containing oil, the pressure of which is identical to the pressure of the oil contained in the first hydraulic ram 57A. This outer volume 64 and this inner volume 65A constitute the hydropneumatic accumulator 67A associated with the first hydraulic ram 57A.

As stated above, the piston 56A is screwed into the hollow part 68A of the rod 46A. At its end extending inside this hollow part 68A, the piston 56A has a discoid part 77A in which there are made a threaded central hole 78 and at least one hole 79A arranged beside the said central hole 78. A hollow screw 80A which has a hole 81A at its centre is screwed into the threaded central hole 78 after the insertion of a concave washer 82 extending inside the space 71 of the hollow part 68A of the rod 46A between the said hollow screw 80A and the corresponding face 83 of the discoid part 77A with the concaveness pointing towards the said face 83. This damper 69A operates like the damper 69 described earlier.

The hollow part 68A of the rod 46A also has one (or more) hole(s) 70 which makes (make) the space 71 of the said hollow part 68A communicate with the small chamber 72A of the first hydraulic ram 57A. The inner cylinder 47A, for its part, has one (or more) hole(s) 73 which makes(make) the said small chamber 72A of the first hydraulic ram 57A communicate with a first collector volume 74 formed between the said inner cylinder 47A and the closing and guiding piece 48A. The latter finally has one (or more) hole(s) 75 which makes(make) the first collector volume 74 communicate with the inner volume 65A of the hydropneumatic accumulator 67A.

The inner cylinder 47A also has one (or more) limiting orifice(s) 113 which makes(make) the large chamber 86A of the first hydraulic ram 57A communicate with the inner volume 65A of the hydropneumatic accumulator 67A. The function of this(these) limiting orifice(s) 113 will be described later.

The second hydraulic ram 58A is fed through a partially threaded feed orifice 93A made in the closing piece 49A.

The first hydraulic ram 57A, for its part, is fed through a communication 114 provided in the piston 53A of the second hydraulic ram 58A. This communication 114 consists of a first duct 115 opening into the chamber 116 of the second hydraulic ram 58A and of a second duct 117 which makes the first duct 115 communicate with a second collector volume 118 provided at the periphery of the piston 53A. The latter furthermore comprises a non-return valve 109A intended to close off the first duct 115.

Each hydraulic-energy converter 37A,38A also has a leak-off orifice 90A made in the closing and guiding piece 48 and which opens into a third collector volume 91A formed in the closing and guiding piece 48A. This leak-off orifice 90A is partially threaded.

Each hydraulic-energy converter 37A, 38A moreover comprises a ring 119 extending into the small chamber 72A of the first hydraulic ram 57A. This ring 119 can slide in leaktight fashion in the closing and guiding piece 48A, whereas there is a space between the said ring 119 and the rod 46A. This ring 119 further comprises one (or more) first hole(s) 120 and one (or more) second hole(s) 121. The second hole(s) 121 is (are) intended to make the small chamber 72A of the first hydraulic ram 57A communicate with the leak-off orifice 90A. The first hole(s) 120, for its (their) part, extends (extend) into that part of the ring 119 which lies between the second hole(s) 121 and that end of the ring 119 intended to come into contact with the piston 56A of the rod 46A. Close to the other end of the said ring 119 there is a compression spring 122 which acts between the closing and guiding piece 48A and the ring 119.

This second device for automatically adjusting the lightening of the harvesting mechanism 15 of the mower 1 also comprises a hydraulic circuit 94A feeding the two hydraulic-energy converters 37A, 38A. This hydraulic circuit 94A comprises, for each hydraulic-energy converter 37A, 38A, a first hydraulic system 95A coupled to the first hydraulic ram 57A, and a second hydraulic system 96A coupled to the second hydraulic ram 58A.

The first hydraulic system 95A comprises a first hydraulic passage 97A intended to feed the first hydraulic ram 57A, and a second hydraulic passage 98A connected to the leak-off orifice 90A of the said first hydraulic ram 57A. The second hydraulic passage 98A for this purpose has a threaded connector 123 screwed into the screw thread of the said leak-off orifice 90A.

The second hydraulic system 96A, for its part, comprises a third hydraulic passage 99A connected to the feed orifice 93A of the second hydraulic ram 58A. The third hydraulic passage 99A for this purpose has a threaded connector 100 screwed into the screw thread of the feed orifice 93A of the second hydraulic ram 58A. The third hydraulic passage 99A furthermore has a controlled non-return valve 108A preventing oil from flowing in the hydraulic-energy converter 37A,38A/oil-supply source 103 direction. The opening of this controlled non-return valve 108A is controlled by the pressure prevailing in the second hydraulic passage 98A.

In this embodiment, the first hydraulic passage 97A therefore consists of the third hydraulic passage 99A and of the communication 114 between the second hydraulic ram 58A and the first hydraulic ram 57A.

Furthermore, the two third hydraulic passages 99A (and, therefore, the two first hydraulic passages 97A) are connected to a first common feedpipe 101A and the two second hydraulic passages 98A are connected to a second common feedpipe 102A. These two common feedpipes 101A, 102A are also coupled to the oil-supply source 103. The first common feedpipe 101A additionally has a throttle valve 107.

This second embodiment of a device for automatically adjusting the lightening of a harvesting mechanism 15 of the mower 1 which has just been described operates as follows.

In the work position, the harvesting mechanism 15 rests on the ground S with a certain apparent weight and can follow the relief of the said ground S. For this, at least one of the hydraulic-energy converters 37A,38A lengthens or shortens as the case may be. While this is happening, oil contained in the inner volume 65A of the hydropneumatic accumulator 67A is transferred into the first hydraulic ram 57A, or oil contained in the first hydraulic ram 57A is transferred into the inner volume 65A of the hydropneumatic accumulator 67A. This transfer takes place through the hole(s) 75 made in the closing and guiding piece 48A, the hole(s) 73 made in the inner cylinder 47A, the hole(s) 70 made in the rod 46A, the holes 79A,81A of the damper 69A, and possibly the limiting orifice(s) 113.

To raise the harvesting mechanism 15, the distributor 106 is placed in its first active position $106^2$. The oil supplied by the pump 104 circulates in the first common feedpipe 101A (it enters the latter through the throttle valve 107) and the three hydraulic passages 99A (it enters these through the corresponding controlled non-return valve 108A), and enters the second hydraulic ram 58A of each hydraulic-energy converter 37A,38A. By entering each second hydraulic ram 58A it moves the corresponding piston 53A towards its predetermined position which is defined by the limiting orifice(s) 113. While this is happening, the said piston 53A causes the corresponding rod 46A to deploy by means of the oil contained in the corresponding first hydraulic ram 57A. Towards the end of deployment of the rod 46A, the piston 56A thereof comes into contact with the ring 119 and makes the latter slide in the closing and guiding piece 48A against the action of the compression spring 122.

If the weight of the harvesting mechanism 15 has not altered since the last raising operation, the second collector volume 118 of the piston 53A comes level with the limiting orifice(s) 113 and the second hole(s) 121 of the ring 119 reaches (reach) the level of the third collector volume 91A (which is in communication with the leak-off orifice 90A) simultaneously.

As the feed continues, the oil that enters the second hydraulic ram 58A flows through the first duct 115, passes through the non-return valve 109A, flows through the second duct 117, passes through the limiting orifice(s) 113, the hole(s) 75 in the closing and guiding piece 48A, the hole(s) 73 in the inner cylinder 47A, the first hole(s) 120 and the second hole(s) 121 in the ring 119 and the leak-off orifice 90A, then returns to tank 105 via the second hydraulic passage 98A and the second common feedpipe 102A.

If the weight of the harvesting mechanism 15 has increased since the last raising operation, the second collector volume 118 of the piston 53A reaches the level of the limiting orifice(s) 113 while the second hole(s) 121 in the ring 119 has(have) not yet reached the third collector volume 91A. With the feed continuing, the oil supplied by the pump 104, which enters the second hydraulic ram 58A flows through the first duct 115, passes through the non-return valve 109A, flows through the second duct 117, passes through the limiting orifice(s) 113, the hole(s) 75 in the closing and guiding piece 48A, the hole(s) 73 in the inner cylinder 47A, the first hole(s) 120 in the ring 119 and the hole(s) 70 in the rod 46A and enters the large chamber 86A of the first hydraulic ram 57A through the holes 79A,81A in the damper 69A. This oil, which enters the large chamber 86A of the first hydraulic ram 57A continues to deploy the rod 46A out of the body 45A until the second hole(s) 121 in the ring 119 reaches (reach) the third collector volume 91A. The deployment of the rod 46A then stops and any surplus oil entering the hydraulic-energy converter 37A,38A returns to tank 105 as explained above.

If the weight of the harvesting mechanism 15 has decreased since the last raising operation, the second hole(s) 121 in the ring 119 reaches(reach) the third collector volume 91A while the second collector volume 118 of the piston 53A has not yet reached the limiting orifice(s) 113. As the deployment of the rod 46A is then stopped, the continuing movement of the piston 53A drives the surplus oil contained in the large chamber 86A of the first hydraulic ram 57A through the holes 79A,81A of the damper 69A, the hole(s) 70 of the rod 46A, the second hole(s) 121 of the ring 119, and the leak-off orifice 90A, from where it returns to tank 105. With the feed continuing, any surplus oil entering the hydraulic-energy converter 37A,38A after the second collector volume 118 of the piston 53A has reached the limiting orifice(s) 113 returns to tank 105 as explained earlier.

In order to lower the harvesting mechanism 15, the distributor 106 is placed in the second active position $106^3$. The weight of the harvesting mechanism 15 then drives the oil contained in the second hydraulic ram 58A out of the latter via the rod 46A and its piston 56A, the oil contained in the first hydraulic ram 57A, and the piston 53A. This oil returns to tank 105 through the third hydraulic passage 99A (where it passes through the controlled non-return valve 108A) and the first common feedpipe 101A. The retraction of the rod 46A into the body 45A of the corresponding hydraulic-energy converter 37A,38A is stopped when the harvesting mechanism 15 comes into contact with the ground S. It should be noted that the volume of oil contained in the first hydraulic ram 57A is maintained, as the harvesting mechanism 15 falls, by the non-return valve 109A which plugs the first duct 115 of the piston 53A.

Figure 23:
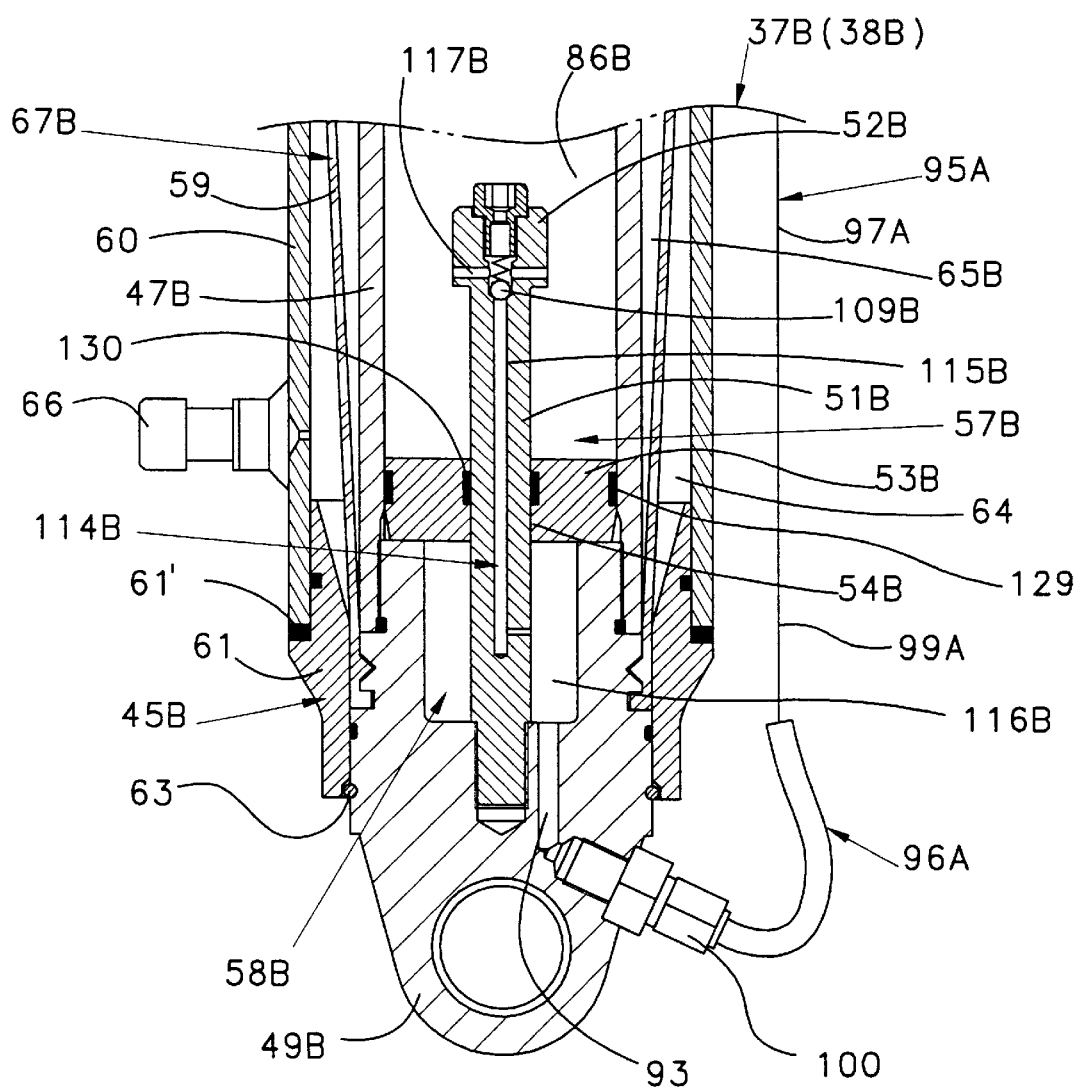
FIG. 23 depicts, partially and in section, the hydraulic-energy converter of a third embodiment of a device for automatically adjusting the lightening, the said hydraulic-energy converter being in the normal work position.

FIG. 23 depicts a third embodiment of a device for automatically adjusting the lightening of the harvesting mechanism 15 of the mower 1. In fact, FIG. 23 shows partially a section through a hydraulic-energy converter 37B,38B of the said device and more precisely the opposite end thereof to the one from which the rod emerges.

The body 45B of this hydraulic-energy converter 37B, 38B has an inner cylinder 47B. Screwed to the opposite end of this inner cylinder 47B to the end from which the rod emerges is a closing piece 49B. This closing piece 49B comprises a tie rod 51B which is screwed into the said closing piece 49B and which at its free end has a shoulder 52B. This tie rod 51B passes through a piston 53B which has a bore 54B for this purpose.

The other end of the hydraulic-energy converter 37B,38B may be identical to that of the hydraulic-energy converters 37A,38A with which the device according to the second embodiment depicted in FIGS. 20 to 22 is fitted.

The hydraulic-energy converter 37B,38B therefore also has a first hydraulic ram 57B formed by the cylinder 47B, the annular piston 53B, the tie rod 51B, the rod 46A equipped with its piston 56A, and the closing and guiding piece 48A. It also has a second hydraulic ram 58B formed by the inner cylinder 47B, the annular piston 53B, the tie rod 51B and the closing piece 49B.

Apart from the inner cylinder 47B, the hydraulic-energy converter 37B,38B also comprises the deformable membrane 59 as well as the outer cylinder 60 and the shut-off ring 61 which form the outer volume 64 containing the gas. The deformable membrane 59 also forms, together with the inner cylinder 47B and the closing and guiding piece 48A, the inner volume 65B containing the oil, the pressure of which is identical to the pressure of the oil contained in the first hydraulic ram 57B. This outer volume 64 and this inner volume 65B constitute the hydropneumatic accumulator 67B associated with the said first hydraulic ram 57B.

The second hydraulic ram 58B is fed through a partially threaded feed orifice 93 provided in the closing piece 49A.

The feed to the first hydraulic ram 57B, for its part, is achieved through a communication 114B provided in the tie rod 51B. This communication 114B consists of a first duct 115B opening into the chamber 116B of the second hydraulic ram 58B, and of a second duct 117B which makes the first duct 115B communicate with the large chamber 86B of the first hydraulic ram 57B. The tie rod 51B also comprises a preloaded non-return valve 109B intended to close off the first duct 115B.

This third embodiment of the device for automatically adjusting the lightening of the harvesting mechanism 15 of the mower 1, which has just been described, operates as follows.

In the working position, this device works like the device according to the second embodiment. The harvesting mechanism 15 rests on the ground S with a certain apparent weight and can follow the relief of the said ground S.

For this, at least one of the hydraulic-energy converters 37B,38B lengthens or shortens as the case may be. While this is happening, oil contained in the inner volume 65B of the hydropneumatic accumulator 67B is transferred into the first hydraulic ram 57B, or oil contained in the first hydraulic ram 57B is transferred into the inner volume 65B of the hydropneumatic accumulator 67B. This transfer takes place through the hole(s) 75 made in the closing and guiding piece 48A, the hole(s) 73 made in the inner cylinder 47A–47B, the hole(s) 70 made in the rod 46A and the holes 79A,81A in the damper 69A.

To raise the harvesting mechanism 15, the distributor 106 is placed in its first active position $106^2$. The oil supplied by the pump 104 flows through the first common feedpipe 101A (it enters the latter through the throttle valve 107), through the third hydraulic passages 99A (it enters these through the corresponding controlled non-return valve 108A) and enters the second hydraulic ram 58B of each hydraulic-energy converter 37B,38B. By entering each second hydraulic ram 58B it moves the corresponding piston 53B towards its predetermined position which is defined by the shoulder 52B of the tie rod 51B. While this is happening, the said piston 53B deploys the corresponding rod 46A by means of the oil contained in the corresponding first hydraulic ram 57B. Towards the end of deployment of the rod 46A, the piston 56A thereof comes into contact with the ring 119 and makes the latter slide in the closing and guiding piece 48A against the action of the compression spring 122. The preloaded non-return valve 109B prevents oil from being able to enter the first hydraulic ram 57B during this phase of deployment of the rod 46A.

If the weight of the harvesting mechanism 15 has not altered since the last raising operation, the piston 53B comes into abutment on the shoulder 52B of the tie rod 51B and the second hole(s) 121 in the ring 119 reaches (reach) the level of the third collector volume 91A (which is in communication with the leak-off orifice 90A) simultaneously.

With feed continuing, the oil that enters the second hydraulic ram 58B, flows through the first duct 115B, passes through the preloaded non-return valve 109B, flows through the second duct 117B, enters the large chamber 86B of the first hydraulic ram 57B, passes through the holes 79A,81A of the damper 69A, the hole(s) 70 of the rod 46A, the second hole(s) 121 of the ring 119 and the leak-off orifice 90A, then returns to tank 105 through the second hydraulic passage 98A and the second common feedpipe 102A.

If the weight of the harvesting mechanism 15 has increased since the last raising operation, the piston 53B comes into abutment on the shoulder 52B of the tie rod 51B while the second hole(s) 121 in the ring 119 has(have) not yet reached the third collector volume 91A. With feed continuing, the oil supplied by the pump 104 which enters the second hydraulic ram 58B flows through the first duct 115B, passes through the preloaded non-return valve 109B, flows through the second duct 117B and enters the large chamber 86B of the first hydraulic ram 57B. This oil which enters the large chamber 86B of the first hydraulic ram 57B continues to deploy the rod 46A out of the body 45B until the second hole(s) 121 in the ring 119 reaches(reach) the third collector volume 91A. The deployment of the rod 46A then stops and any surplus oil entering the hydraulic-energy converter 37B,38B returns to tank 105 as explained above.

If the weight of the harvesting mechanism 15 has decreased since the last raising operation, the second hole(s) 121 in the ring 119 reaches(reach) the third collector volume 91A when the piston 53B has not yet reached the shoulder 52B of the tie rod 51B. As the deployment of the rod 46A is then stopped the continuing movement of the piston 53B drives the surplus oil contained in the large chamber 86B of the first hydraulic ram 57B through the holes 79A,81A in the damper 69A, the hole(s) 70 in the rod 46A, the second hole(s) 121 in the ring 119 and the leak-off orifice 90A, from where it returns to tank 105. With feed continuing, any surplus oil which enters the second hydraulic ram 58B after the piston 53B has come to rest on the shoulder 52B of the tie rod 51B, returns to tank 105 as explained earlier.

In order to lower the harvesting mechanism 15, the distributor 106 is placed in the second active position $106^3$. The weight of the harvesting mechanism 15 then drives the oil contained in the second hydraulic ram 58B out of the latter via the rod 46A and its piston 56A, the oil contained in the first hydraulic ram 57B, and the piston 53B. This oil returns to tank 105 through the third hydraulic passage 99A (where it passes through the controlled non-return valve 108A) and the first common feedpipe 101A. The retraction of the rod 46A into the body 45B of the corresponding hydraulic-energy converter 37B,38B is stopped when the harvesting mechanism 15 comes into contact with the ground S. It should be noted that the volume of oil contained in the first hydraulic ram 57B is maintained as the harvesting mechanism 15 falls by the preloaded non-return valve 109B which plugs the first duct 115B of the tie rod 51B.

FIGS. 24 to 26 show a fourth embodiment of a device for automatically adjusting the lightening of the harvesting mechanism 15 of the mower 1.

Each hydraulic-energy converter 37C,38C of this device comprises a body 45C and a rod 46C. The body 45C first of all has an inner cylinder 47C to the end on the same side as the rod 46C of which is screwed a piece 48C for closing the body 45C and for guiding the rod 46C, and to the other end of which is screwed a closing piece 49C. The closing and guiding piece 48C has a bore 50C for the passage and guidance of the said rod 46C.

The rod 46C is hollow and formed of a tube 124 to the outer end of which is screwed an end-piece 125. At its other end, that is to say the end which extends into the body 45C, the rod 46C has a first stop ring 76 which limits the deployment of the rod 46C out of the body 45C by butting against the closing and guiding piece 48C. A piston 53C, of the plunger type, is intended to slide inside the rod 46C.

Thus, each hydraulic-energy converter 37C,38C comprises a first hydraulic ram 57C formed by the inner cylinder 47C, the rod 46C, the piston 53C, the closing and guiding piece 48C and the closing piece 49C. It also comprises a second hydraulic ram 58C formed by the rod 46C, the plunger piston 53C and the end-piece 125.

Apart from the inner cylinder 47C, each hydraulic-energy converter 37C,38C also has the deformable membrane 59 as well as an outer cylinder 60C and a closing-off ring 61C which form the outer volume 64C containing the gas. The deformable membrane 59 also forms, together with the inner cylinder 47C and the closing and guiding piece 48C, the inner volume 65C containing oil, the pressure of which is identical to the pressure of the oil contained in the first hydraulic ram 57C. This outer volume 64C and this inner volume 65C constitute the hydropneumatic accumulator 67C associated with the first hydraulic ram 57C. The closing-off ring 61C is provided with an inflation valve 66C which allows the volume of gas needed to be let in.

The second hydraulic ram 58C is fed through a partially threaded feed orifice 93C provided in the end-piece 125.

The feed to the first hydraulic ram 57C, for its part, is through a communication 114C provided in the plunger piston 53C of the second hydraulic ram 58C. This communication 114C consists of a first duct 115C opening into the chamber 116C of the second hydraulic ram 58C, and of a second duct 117C which makes the first duct 115C communicate with a second collector volume 118C provided at the periphery of the piston 53C. The latter further comprises a non-return valve 109C intended to close off the first duct 115C.

Each hydraulic-energy converter 37C,38C also has a leak-off orifice 90A made in the closing and guiding piece 48C and which opens into a third collector volume 91C formed in the closing and guiding piece 48C. This leak-off orifice 90A is partially threaded.

The closing and guiding piece 48C further comprises one (or more) hole(s) 75C which makes(make) the inner volume 65C of the hydropneumatic accumulator 67C communicate with the first hydraulic ram 57C.

The rod 46C, for its part, has one (or more) hole(s) 92C which is(are) intended to make the second collector volume 118C communicate with the third collector volume 91C. It also has a third duct 126 which makes the (one of the) hole(s) 92C communicate with the first hydraulic ram 57C.

This fourth device for automatically adjusting the lightening of the harvesting mechanism 15 of the mower 1 also has a hydraulic circuit 94C feeding the two hydraulic-energy converters 37C,38C. This hydraulic circuit 94C comprises, for each hydraulic-energy converter 37C,38C, a first hydraulic system 95C coupled to the first hydraulic ram 57C and a second hydraulic system 96C coupled to the second hydraulic ram 58C.

The first hydraulic system 95C comprises a first hydraulic passage 97C intended to feed the first hydraulic ram 57C, and a second hydraulic passage 98A connected to the leak-off orifice 90A of the said first hydraulic ram 57C. The second hydraulic passage 98A has, for this purpose, a threaded connection 123 screwed into the screw thread of the said leak-off orifice 90A.

The second hydraulic system 96C, for its part, has a third hydraulic passage 99C connected to the feed orifice 93C of the second hydraulic ram 58C. The third hydraulic passage 99C for this purpose has a threaded connector 100 screwed into the screw thread of the feed orifice 93C of the second hydraulic ram 58C. The third hydraulic passage 99C further comprises a controlled non-return valve 108A preventing oil from flowing in the hydraulic-energy converter 37C,38C/oil-supply source 103 direction. The opening of this controlled non-return valve 108A is controlled by the pressure prevailing in the second hydraulic passage 98A.

In this embodiment, the first hydraulic passage 97C therefore consists of the third hydraulic passage 99C and of the communication 114C between the second hydraulic ram 58C and the first hydraulic ram 57C.

Furthermore, the two third hydraulic passages 99C (and therefore the two first hydraulic passages 97C) are connected to a first common feedpipe 101A and the two second hydraulic passages 98A are connected to a second common feedpipe 102A. These two common feedpipes 101A,102A are also coupled to the oil-supply source 103. The first common feedpipe 101A additionally has a throttle valve 107.

This fourth embodiment of a device for automatically adjusting the lightening of the harvesting mechanism 15 of the mower 1 which has just been described operates as follows.

In the work position, the harvesting mechanism 15 rests on the ground S with a certain apparent weight and can follow the relief of the said ground S. For this, at least one of the hydraulic-energy converters 37C,38C lengthens or shortens, as the case may be. As this happens, oil contained in the inner volume 65C of the hydropneumatic accumulator 67C is transferred into the first hydraulic ram 57C, or oil contained in the first hydraulic ram 57C is transferred into the inner volume 65C of the hydropneumatic accumulator 67C. This transfer takes place through the hole(s) 75C made in the closing and guiding piece 48C.

To raise the harvesting mechanism 15, the distributor 106 is placed in its first active position $106^2$. The oil supplied by the pump 104 flows through the first common feedpipe 101A (it enters the latter through the throttle valve 107), through the third hydraulic passages 99C (it enters these through the corresponding controlled non-return valve 108A) and enters the second hydraulic ram 58C of each hydraulic-energy converter 37C,38C. By entering each second hydraulic ram 58C it moves the corresponding piston 53C towards its predetermined position which is defined by a second stop ring 127 mounted in the rod 46C. As this happens, the said piston 53C makes the corresponding rod 46C deploy by means of the oil contained in the corresponding first hydraulic ram 57C.

If the weight of the harvesting mechanism 15 has not altered since the last raising operation, the piston 53C comes into abutment on the second stop ring 127 and the hole(s) 92C in the rod 46C reaches(reach) the level of the third collector volume 91C (which is in communication with the leak-off orifice 90A) simultaneously.

With feed continuing, the oil which enters the second hydraulic ram 58C flows through the first duct 115C, passes through the non-return valve 109C, flows through the second duct 117C, into the second collector volume 118C, passes through the hole(s) 92C in the rod 46C, flows through the third collector volume 91C, passes through the leak-off orifice 90A, then returns to tank 105 via the second hydraulic passage 98A and the second common feedpipe 102A.

If the weight of the harvesting mechanism 15 has increased since the last raising operation, the piston 53C comes into abutment on the second stop ring 127 when the hole(s) 92C in the rod 46C has(have) not yet reached the third collector volume 91C. With feed continuing, the oil supplied by the pump 104 which enters the second hydraulic ram 58C flows through the first duct 115C, passes through the non-return valve 109C, flows through the second duct 117C, through the second collector volume 118C, passes through the hole 92C in the rod 46C communicating with the third duct 126, flows through the said third duct 126, and enters the first hydraulic ram 57C. This oil which enters the first hydraulic ram 57C continues to deploy the rod 46C out of the body 45C until the hole(s) 92C in the rod 46C reaches(reach) the third collector volume 91C. The deployment of the rod 46C then stops and any surplus oil entering the hydraulic-energy converter 37C,38C returns to tank 105 as explained above.

If the weight of the harvesting mechanism 15 has decreased since the last raising operation, the hole(s) 92C in the rod 46C reaches(reach) the third collector volume 91C when the piston 53C is not yet in abutment on the second stop ring 127. As the deployment of the rod 46C is then stopped, the continuing movement of the piston 53C drives the surplus oil contained in the first hydraulic ram 57C through the third duct 126, the corresponding hole 92C in the rod 46C, the third collector volume 91C and the leak-off orifice 90A, from where it returns to tank 105. With feed continuing, any surplus oil entering the hydraulic-energy converter 37C,38C after the piston 53C has come into abutment on the second stop ring 127 returns to tank 105 as explained earlier.

To lower the harvesting mechanism 15, the distributor 106 is placed in the second active position $106^3$. The weight of the harvesting mechanism 15 then drives the oil contained in the second hydraulic ram 58C out of the latter via the rod 46C, the oil contained in the first hydraulic ram 57C and the piston 53C. This oil returns to tank 105 through the third hydraulic passage 99C (where it passes through the controlled non-return valve 108A), and the first common feedpipe 101A. The retraction of the rod 46C into the body 45C of the corresponding hydraulic-energy converter 37C,38C is stopped when the harvesting mechanism 15 comes into contact with the ground S. It should be noted that the volume of oil contained in the first hydraulic ram 57C is maintained as the harvesting mechanism 15 falls by the non-return valve 109C which plugs the first duct 115C of the piston 53C.

Figure 27:
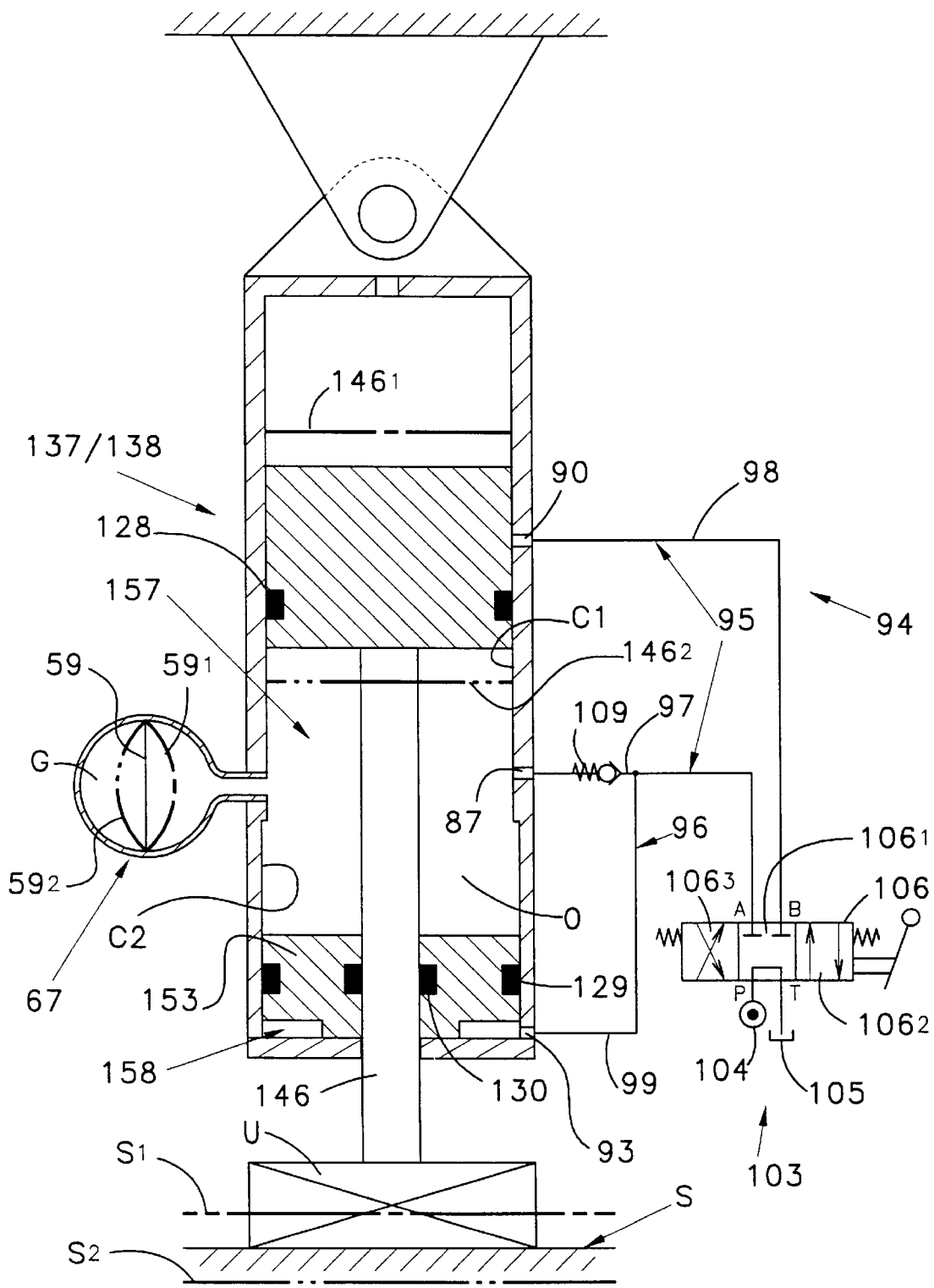
FIG. 27 diagrammatically depicts a device for automatically adjusting the lightening of a working unit of a machine according to the second family of embodiments, the hydraulic-energy converter being in the normal work position.

Whereas FIGS. 1 to 10 diagrammatically show the first family of embodiments of devices for automatically adjusting the lightening of a working unit U in which the hydraulic-energy converter(s) 37/38 raises(raise) the working unit U by lengthening, FIGS. 27 and 28 diagrammatically show the second family of embodiments of devices for automatically adjusting the lightening of a working unit U in which the hydraulic-energy converter(s) 137/138 raises (raise) the working unit U by shortening.

In the second family of embodiments, the hydraulic-energy converter(s) 137/138 also(each) comprises a first hydraulic ram 157 equipped in particular with a rod 146 and associated with a (corresponding) hydropneumatic accumulator 67 in which the pressure of the gas G can be set initially to a value that corresponds to the desired amount of lightening of the working unit U.

This(these) hydraulic-energy converter(s) 137/138 also (each) comprises a second hydraulic ram 158, the piston 153 of which can move in the cylinder $C_2$ of the said second hydraulic ram 158 as far as a predetermined position PP provided in the said cylinder $C_2$. The piston 153 of the second hydraulic ram 158, of the annular type, is detached from the rod 146 of the first hydraulic ram 157 and acts on the latter rod via the oil O contained in the first hydraulic ram 157.

The first hydraulic ram 157 and the second hydraulic ram 158 of the (of each) hydraulic-energy converter 137/138 are fed in the same way as the first hydraulic ram 57 and second hydraulic ram 58 of the hydraulic-energy converter(s) 37/38 of the devices for automatically adjusting the lightening of a working unit U of the first family.

The same is true of the way in which they work.

It should finally be pointed out that any person skilled in the art knows that a hydraulic-energy converter comprises seals to prevent oil leaks. These seals have been depicted in FIGS. 14 to 26 (their respective cross-section has been blackened) but have not been mentioned in the description of these figures. The only seals to which reference should be made are those which prevent oil from escaping unintentionally from the leak-off orifice 90,90A (these first seals are referenced 128) and the seals which prevent oil from being able to flow from the second hydraulic ram 58;58A;58B;58C;158 towards the first hydraulic ram 57;57A;57B;57C;157 or vice versa. These second seals are referenced 129,130. This(these) first seal(s) and this(these) second seal(s) therefore in particular play a part in maintaining the volume of oil in the(each) first hydraulic ram 57;57A;57B;57C;157 while the working unit U;15 is being lowered. Furthermore, they also play a part in favouring the feeding of the second hydraulic ram 58;58A;58B;58C;158 as long as the piston 53;53A;53B;53C;153 thereof is not in its predetermined position PP.

In the embodiment according to FIGS. 14 to 19, the first seal(s) 128 acts(act) between the rod 46 and the closing and guiding piece 48 and is(are) fitted in that part of the said closing and guiding piece 48 which extends between the leak-off orifice 90 and the small chamber 72 of the first hydraulic ram 57. The second seal(s) 129 acts(act), for their part, between the piston 53 and the inner cylinder 47.

In the embodiment of FIG. 23, the second seal(s) 129 acts(act) also between the piston 53B and the inner cylinder 47B. The second seal(s) 130, for its (their) part, acts(act) between the piston 53B and the tie rod 51B.

In the embodiment of FIGS. 20 to 22, the first seals 128 act between the ring 119 and the closing and guiding piece 48A. In fact, these first seals 128 are fitted one on either side of the third collector volume 91A. The second seal(s) 129 acts(act), for their part, between the piston 53A and the inner cylinder 47A. It(they) is(are) mounted on that part of the piston 53A that extends between the second collector volume 118 and the large chamber 86A of the first hydraulic ram 57A.

In the embodiment of FIGS. 24 to 26, the first seal(s) 128 acts(act) between the rod 46C and the closing and guiding piece 48C and is(are) fitted in that part of the said closing and guiding piece 48C which extends between the third collector volume 91C and the chamber 86C of the first hydraulic ram 57C. The second seal(s) 129 acts(act) between the piston 53C and the rod 46C. It(they) is(are) fitted between the second collector volume 118C of the said piston 53C and the chamber 86C of the first hydraulic ram 57C.

In the second family of embodiments (FIGS. 27 and 28) the first seal(s) 128 acts(act) between the rod 146 and the cylinder $C_1$ of the first hydraulic ram 157. The second seals 129,130, for their part, act between the piston 153 and the cylinder $C_2$ of the second hydraulic ram 158, and between the piston 153 and the rod 146, respectively.

It should be remembered that the various embodiments which have just been described do not in any way constitute any kind of limitation of the present invention. Combinations between the various examples are perfectly possible (thus, the embodiments of FIGS. 20 to 26 could also be provided with a second controlled non-return valve 110 and/or with a second non-return valve 111), and other embodiments are entirely envisageable.

What is claimed is:

1. Method for automatically adjusting a lightening of a working unit of a machine, which working unit is carried by a carrying structure in such a way as to rest on a ground during work and be held away from said ground when work is interrupted or during transport, said working unit being configured to be lowered so as to be brought to rest on the ground and to be raised so as to be brought away from said ground by means of at least one hydraulic-energy converter fed by an oil-supply source through a hydraulic circuit and having a first hydraulic ram equipped with a rod and associated with a hydropneumatic accumulator in which a pressure of a gas can be set initially to a value that corresponds to an amount of lightening desired for the working unit, and having a second hydraulic ram, the working unit being raised and lowered using the second hydraulic ram of which a piston, which can move as far as a predetermined position in a cylinder of said second hydraulic ram and which is detached from the rod of the first hydraulic ram, acts on said rod via an oil contained in the first hydraulic ram, the method comprising the steps of:

raising the working unit whereby a volume of oil in the first hydraulic ram is increased only if, with the piston of the second hydraulic ram in the predetermined position, the working unit does not reach a predetermined height, and the volume of oil in the first hydraulic ram is decreased only if said working unit has reached the predetermined height, while the piston of the second hydraulic ram has not yet reached the predetermined position; whereby the working unit is always at the predetermined height at an end of raising travel when the piston of the second hydraulic ram is in the predetermined position; and lowering the working unit whereby the volume of oil in the first hydraulic ram is maintained when lowering the working unit.

2. Device for automatically adjusting a lightening of a working unit of a machine, which working unit is carried by a carrying structure in such a way as to rest on a ground during work and be held away from said ground when work is interrupted or during transport, said working unit being configured to be lowered so as to be brought to rest on said ground and to be raised so as to be brought away from said ground by means of said device, said device comprising;

at least one hydraulic-energy converter fed by an oil-supply source through a hydraulic circuit and having a first hydraulic ram equipped with a rod and associated with a hydropneumatic accumulator in which a pressure of a gas can be set initially to a value that corresponds to an amount of lightening desired for the working unit;

the hydraulic-energy converter having a second hydraulic ram of which a piston, which can move as far as a predetermined position in a cylinder of said second hydraulic ram and which is detached from the rod of the first hydraulic ram, acts directly or indirectly on the rod via an oil contained in the first hydraulic ram;

said hydraulic circuit comprising a first hydraulic system coupled to the first hydraulic ram of the hydraulic-energy converter which has at least one suitable orifice for connection to the first hydraulic system, the hydraulic circuit having a second hydraulic system coupled to the second hydraulic ram of the hydraulic-energy converter, said hydraulic-energy converter also having at least one suitable orifice for connecting the second hydraulic system;

means for increasing and decreasing the volume of oil in the first hydraulic ram at an end of raising travel of the working unit; and means for maintaining the volume of oil in the first hydraulic ram when the working unit is being lowered.

3. Device for automatically adjusting the lightening of a working unit of a machine according to claim 2, characterized in that the hydropneumatic accumulator is integrated into the hydraulic-energy converter.

4. Device for automatically adjusting the lightening of a working unit of a machine according to claim 3, characterized in that the hydropneumatic accumulator surrounds a cylinder of the first hydraulic ram of the hydraulic-energy converter.

5. Device for automatically adjusting the lightening of a working unit of a machine according to claim 4, characterized in that the hydraulic-energy converter comprises:

an inner cylinder forming the cylinder of the first hydraulic ram, an outer cylinder, and a deformable membrane dividing a space between the inner cylinder and the outer cylinder into two volumes: a first volume containing a gas and a second volume containing the oil, a pressure of which is identical to a pressure of the oil contained in the first hydraulic ram, the first volume containing the gas and the second volume containing the oil constituting the hydropneumatic accumulator.

6. Device for automatically adjusting the lightening of a working unit of a machine according to claim 5, characterized in that the inner cylinder also constitutes the cylinder of the second hydraulic ram.

7. Device for automatically adjusting the lightening of a working unit of a machine according to claim 5, characterized in that the first volume is delimited by the outer cylinder and the membrane, while the second volume is delimited by the inner cylinder and the membrane.

8. Device for automatically adjusting the lightening of a working unit of a machine according to claim 7, characterized in that the outer cylinder is provided with a valve for inflating the first volume.

9. Device for automatically adjusting the lightening of a working unit of a machine according to claim 7, further comprising a closing-off ring connected to the outer cylinder that is provided with a valve for inflating the first volume.

10. Device for automatically adjusting the lightening of a working unit of a machine according to claim 2, characterized in that a rod of the first hydraulic ram is hollow and constitutes the cylinder of the second hydraulic ram.

11. Device for automatically adjusting the lightening of a working unit of a machine according to claim 10, characterized in that a feed orifice of the second hydraulic ram is provided close to a outer end of the rod.

12. Device for automatically adjusting the lightening of a working unit of a machine according to claim 2, characterized in that the piston of the second hydraulic ram is a plunger piston.

13. Device for automatically adjusting the lightening of a working unit of a machine according to claim 2, characterized in that the piston of the second hydraulic ram is an annular piston.

14. Device for automatically adjusting the lightening of a working unit of a machine according to claim 2, characterized in that the predetermined position as far as which the piston can move in the cylinder of the second hydraulic ram is determined by a stop member.

15. Device for automatically adjusting the lightening of a working unit of a machine according to claim 14, characterized in that the stop member includes an attached shoulder provided in the cylinder of the second hydraulic ram.

16. Device for automatically adjusting the lightening of a working unit of a machine according to claim 14, characterized in that the stop member consists of a shoulder provided in the cylinder of the second hydraulic ram.

17. Device for automatically adjusting the lightening of a working unit of a machine according to claim 14, characterized in that the stop member consists of a tie rod secured to an end of the hydraulic-energy converter which is on a same side as the second hydraulic ram.

18. Device for automatically adjusting the lightening of a working unit of a machine according to claim 17, characterized in that the tie rod extends inside the piston of the second hydraulic ram.

19. Device for automatically adjusting the lightening of a working unit of a machine according to claim 18, characterized in that the tie rod extends coaxially inside the piston of the second hydraulic ram.

20. Device for automatically adjusting the lightening of a working unit of a machine according to claim 18, characterized in that the tie rod passes through the piston of the second hydraulic ram.

21. Device for automatically adjusting the lightening of a working unit of a machine according to claim 2, characterized in that the predetermined position as far as which the piston can move in the cylinder of the second hydraulic ram is determined by at least one limiting orifice provided in a cylinder of second hydraulic ram and intended to discharge the surplus oil injected into the said second hydraulic ram.

22. Device for automatically adjusting the lightening of a working unit of a machine according to claim 21, characterized in that the limiting orifice opens into the first hydraulic ram.

23. Device for automatically adjusting the lightening of a working unit of a machine according to claim 2, characterized in that a damper dampens movements of the rod of the hydraulic-energy converter which are allowed by the hydropneumatic accumulator.

24. Device for automatically adjusting the lightening of a working unit of a machine according to claim 23, characterized in that the rod has a hollow part in which said damper is fitted.

25. Device for automatically adjusting the lightening of a working unit of a machine according to claim 23, characterized in that the damper has means for slowing down an ascension of the working unit.

26. Device for automatically adjusting the lightening of a working unit of a machine according to claim 25, characterized in that the means for slowing down allows for a flow of oil into the first hydraulic ram more when the working unit rises than when the working unit falls.

27. Device for automatically adjusting the lightening of a working unit of a machine according to claim 26, characterized in that the damper has:

a discoid part fitted inside the first hydraulic ram and having a central hole and at least one hole arranged beside the central hole, a hollow screw screwed into the central hole, and a concave washer extending between the hollow screw and a corresponding face of the discoid part, the concaveness pointing towards said face so that the concave washer partially covers the hole arranged beside the central hole.

28. Device for automatically adjusting the lightening of a working unit of a machine according to claim 27, characterized in that an elastic washer is also provide, said elastic washer being inserted between the concave washer and the corresponding face of the discoid part.

29. Device for automatically adjusting the lightening of a working unit of a machine according to claim 2, characterized in that one of the at least one suitable orifice of the hydraulic-energy converter connected to the first hydraulic system is a leak-off orifice which allows oil contained in the first hydraulic ram to return to the oil-supply source through said first hydraulic system, a feed orifice of the first hydraulic ram said leak-off orifice forming part of the means for increasing and decreasing the volume of oil in said first hydraulic ram.

30. Device for automatically adjusting the lightening of a working unit of a machine according to claim 29, characterized in that the hydraulic-energy converter has a ring capable of sliding in sealed fashion in a body of said hydraulic-energy converter and having at least one orifice which allows the first hydraulic ram to communicate with the leak-off orifice, an orifice of said ring being placed in communication with the leak-off orifice as the working unit is raised.

31. Device for automatically adjusting the lightening of a working unit of a machine according to claim 30, characterized in that the orifice of the ring is placed in communication with the leak-off orifice by the rod.

32. Device for automatically adjusting the lightening of a working unit of a machine according to claim 30, characterized in that the orifice of the ring is taken out of communication with the leak-off orifice by an elastically deformable member.

33. Device for automatically adjusting the lightening of a working unit of a machine according to claim 29, characterized in that the rod of the hydraulic-energy converter has a hollow part into which at least one hole opens, allowing the first hydraulic ram to be placed in communication with the leak-off orifice.

34. Device for automatically adjusting the lightening of a working unit of a machine according to claim 33, characterized in that the hydraulic-energy converter additionally has a collector connected to the leak-off orifice and surrounding the rod.

35. Device for automatically adjusting the lightening of a working unit of a machine according to claim 29, characterized in that
the first hydraulic system has a first hydraulic passage intended to feed the first hydraulic ram, a second hydraulic passage in communication with the leak-off orifice of said first hydraulic ram;
the second hydraulic system has a third hydraulic passage in communication with a feed orifice of the second hydraulic ram;
the means for maintaining the volume of oil in the first hydraulic ram as the working unit is lowered including a means for preventing oil from getting out of said first hydraulic ram through the first hydraulic passage; and
a means for feeding the second hydraulic ram as the working unit is raised.

36. Device for automatically adjusting the lightening of a working unit of a machine according claim 35, characterized in that the means for preventing oil from getting out of the first hydraulic ram through the first hydraulic passage consists of a first non-return valve.

37. Device for automatically adjusting the lightening of a working unit of a machine according to claim 35, characterized in that the means for feeding the second hydraulic ram as the working unit is raised includes means for preventing the first hydraulic ram from being fed as long as the piston of the second hydraulic ram is not in the predetermined position.

38. Device for automatically adjusting the lightening of a working unit of a machine according to claim 37, characterized in that:
the means for preventing oil from getting out of the first hydraulic ram through the first hydraulic passage is a first non-return valve, and
the means for preventing the first hydraulic ram from being fed as long as the piston of the second hydraulic ram is not in the predetermined position comprises the first non-return valve which is a preloaded non-return valve.

39. Device for automatically adjusting the lightening of a working unit of a machine according to claim 35, characterized in that the feeding of the first hydraulic ram takes place through an adjustable throttle valve.

40. Device for automatically adjusting the lightening of a working unit of a machine according to claim 39, further comprising a number of hydraulic-energy converters, the first hydraulic rams of which are fed through a single throttle valve.

41. Device for automatically adjusting the lightening of a working unit of a machine according to claim 35, characterized in that:
the first hydraulic passage is coupled to the third hydraulic passage; and
the means for preventing oil from getting out of the first hydraulic ram through the first hydraulic passage is fitted between the feed orifice of the first hydraulic ram and a coupling of the first hydraulic passage to the third hydraulic passage.

42. Device for automatically adjusting the lightening of a working unit of a machine according to claim 41, characterized in that the third hydraulic passage comprises a first controlled non-return valve configured to prevent oil from flowing in a second hydraulic ram/oil-supply source direction, an opening of the first controlled non-return valve being controlled by a pressure prevailing in the second hydraulic passage.

43. Device for automatically adjusting the lightening of a working unit of a machine according to claim 42, characterized in that the second hydraulic passage comprises a second controlled non-return valve configured to prevent oil from flowing in the first hydraulic ram/oil-supply source direction, an opening of the first controlled non-return valve and respectively of the second controlled non-return valve being controlled by the pressure prevailing in the second hydraulic passage upstream of the second controlled non-return valve and respectively by a pressure prevailing in the third hydraulic passage upstream of the first controlled non-return valve.

44. Device for automatically adjusting the lightening of a working unit of a machine according to claim 43, characterized in that:
the second hydraulic passage comprises a second non-return valve configured to prevent oil from flowing in the first hydraulic ram/oil-supply source direction, and
the second controlled non-return valve is provided upstream of the second non-return vale.

45. Device for automatically adjusting the lightening of a working unit of a machine according to claim 35, characterized in that:
the first hydraulic passage comprises at least partially the third hydraulic passage and a communication between the second hydraulic ram and the first hydraulic ram; and
the means fir preventing oil from getting out of the first hydraulic ram through the first hydraulic passage act at said communication between the second hydraulic ram and the first hydraulic ram.

46. Device for automatically adjusting the lightening of a working unit of a machine according to claim 45, characterized in that:

the predetermined position as far as which the piston can move in the cylinder of the second hydraulic ram is determined by a stop which consists of a tie rod secured to an end of the hydraulic-energy converter which is on a same side as the second hydraulic ram, said tie rod passing through the piston of the second hydraulic ram, and the communication between the second hydraulic ram and the first hydraulic ram is provided in said tie rod.

47. Device for automatically adjusting the lightening of a working unit of a machine according to claim 45, characterized in that the communication between the second hydraulic ram and the first hydraulic ram is provided in the piston of the second hydraulic ram.

48. Device for automatically adjusting the lightening of a working unit of a machine according to claim 47, characterized in that:

the predetermined position as far as which the piston can move in the cylinder of the second hydraulic ram is determined by at least one limiting orifice provided in the cylinder of the second hydraulic ram and intended to discharge a surplus oil injected into said second hydraulic ram, and the communication between the second hydraulic ram and the first hydraulic ram further includes the limiting orifice.

49. Device for automatically adjusting the lightening of a working unit of a machine according to claim 35, characterized in that the second hydraulic passage comprises a second non-return valve configured to prevent oil from flowing in a first hydraulic ram/oil-supply source direction.

50. Machine comprising at least one device for automatically adjusting a lightening of a working unit as claimed in claim 2.

51. Machine according to claim 50, characterized in that the machine is an agricultural machine.

52. Machine according to claim 51, characterized in that the machine is a harvesting machine.

53. Machine according to claim 51, characterized in that the machine is a cutting machine.

54. Machine according to claims 53, characterized in that the machine is a mower.

55. Machine according to claim 53, characterized in that the machine is a mower with a device for treating a cut product.

* * * * *